United States Patent
Yamamoto et al.

(10) Patent No.: US 6,948,816 B2
(45) Date of Patent: Sep. 27, 2005

(54) METHOD OF MANUFACTURING PROGRESSIVE POWER SPECTACLE LENS

(75) Inventors: Chikara Yamamoto, Saitama-ken (JP); Moriyasu Shirayanagi, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/237,071

(22) Filed: Sep. 9, 2002

(65) Prior Publication Data

US 2003/0048408 A1 Mar. 13, 2003

(30) Foreign Application Priority Data

Sep. 11, 2001 (JP) .......................................... 2001-275731

(51) Int. Cl.⁷ ................................................. G02C 7/06
(52) U.S. Cl. ...................................... 351/177; 351/169
(58) Field of Search .................................. 351/169, 177

(56) References Cited

U.S. PATENT DOCUMENTS

| 5,444,503 A | 8/1995 | Kelch et al. |
| 5,719,657 A | 2/1998 | Izawa et al. |
| 5,854,669 A | 12/1998 | Altheimer et al. |
| 6,019,470 A * | 2/2000 | Mukaiyama et al. ........ 351/169 |
| 6,074,062 A | 6/2000 | Morris et al. |
| 6,089,713 A | 7/2000 | Hof et al. |
| 6,186,627 B1 | 2/2001 | Obara |
| 6,199,983 B1 | 3/2001 | Kato et al. |
| 6,318,859 B1 | 11/2001 | Baudart et al. |
| 6,382,789 B1 | 5/2002 | Baudart et al. |
| 6,419,549 B2 * | 7/2002 | Shirayanagi .................... 451/5 |
| 2001/0031607 A1 | 10/2001 | Shirayanagi |
| 2002/0018178 A1 | 2/2002 | Shirayanagi et al. |

FOREIGN PATENT DOCUMENTS

| DE | 10109603 | 8/2001 |
| GB | 2362347 | 11/2001 |

* cited by examiner

*Primary Examiner*—Scott J. Sugarman
(74) *Attorney, Agent, or Firm*—Greenblum & Bernstein, P.L.C.

(57) ABSTRACT

According to a method of manufacturing a progressive power spectacle lens, available vertex powers are divided into a plurality of vertex power groups, one surface of a spectacle lens has been formed as a common surface for the vertex powers within each of the plurality of vertex power groups, and an opposite surface of the spectacle lens is formed as a progressive power surface in accordance with a desired vertex power.

20 Claims, 23 Drawing Sheets

SPH-2.00 ADD2.00

SPH-2.00 ADD2.00

SPH-.00 ADD2.00

SPH-0.00 ADD2.00

SPH+1.00 ADD2.00

SPH+1.00 ADD2.00

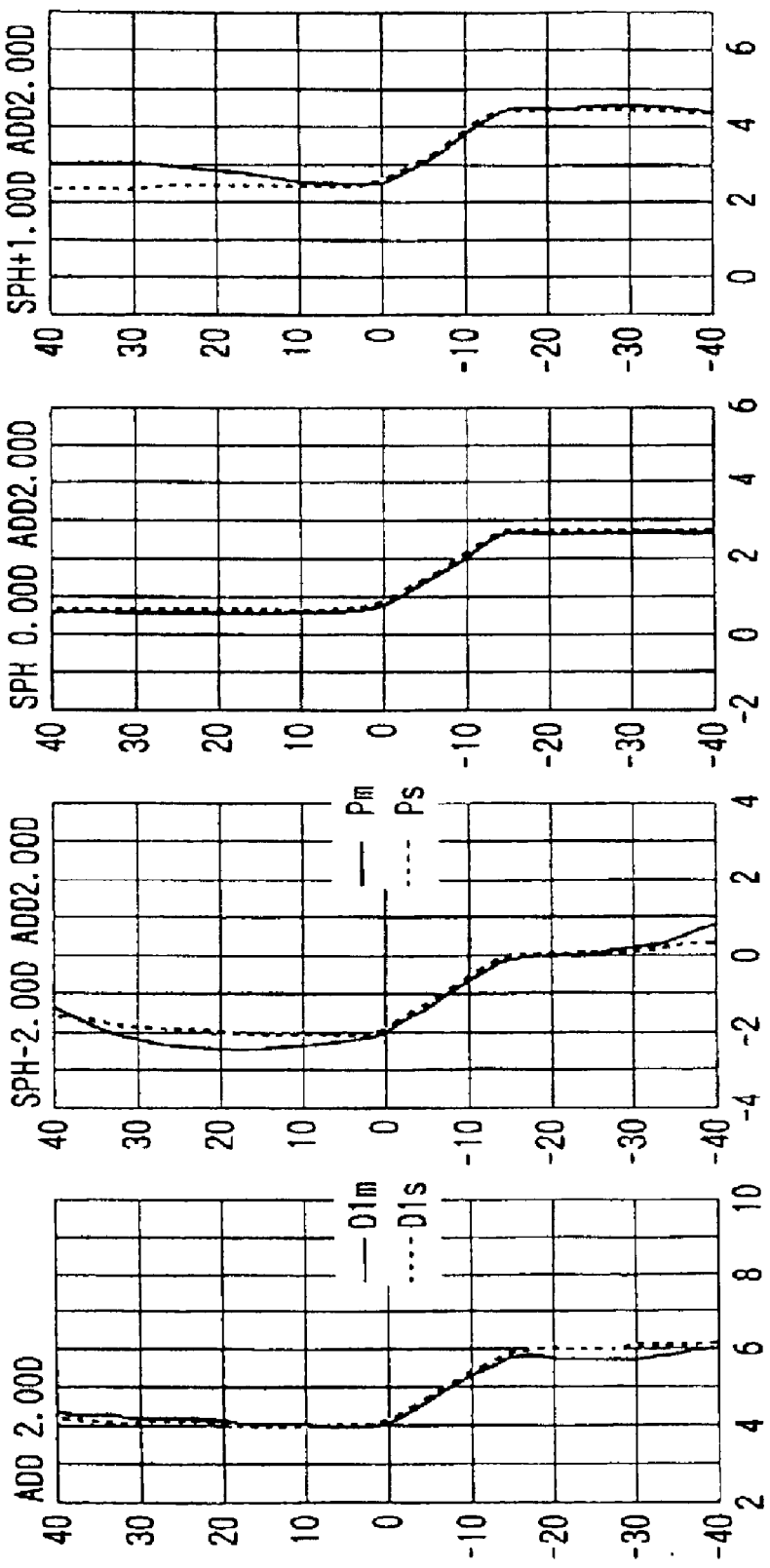

FIG.23A
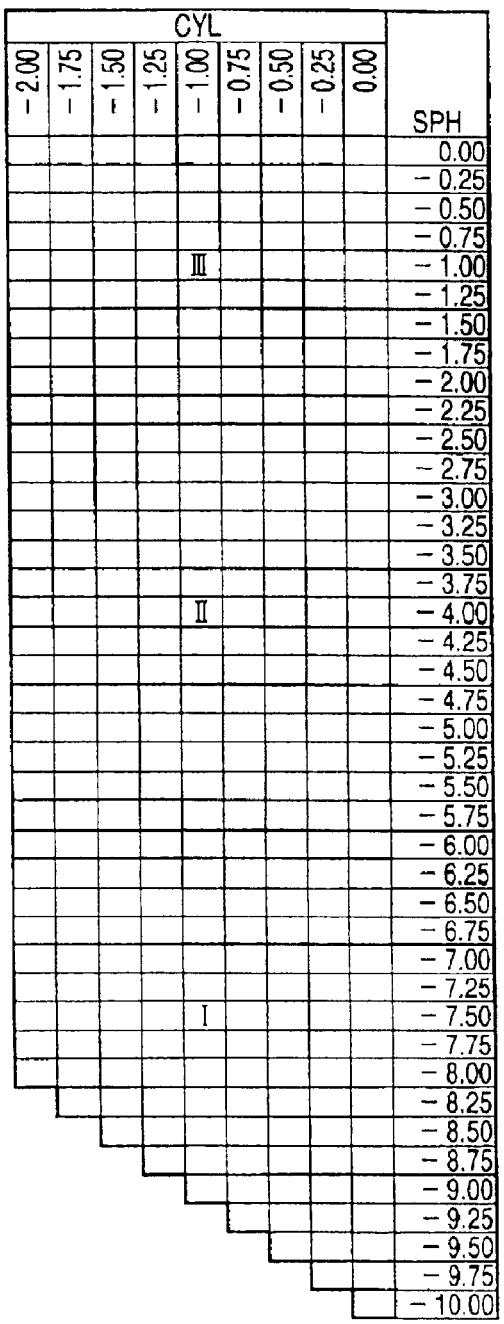
FIG.23B
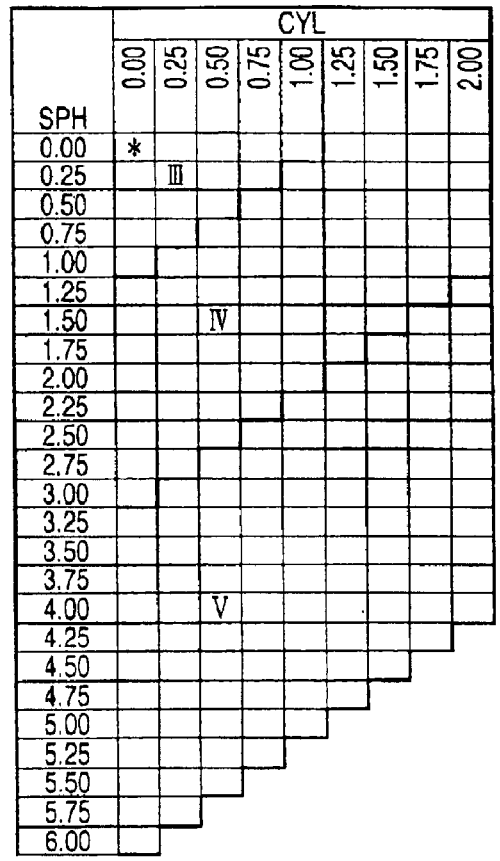
FIG.23C

METHOD OF MANUFACTURING PROGRESSIVE POWER SPECTACLE LENS

BACKGROUND OF THE INVENTION

The present invention relates to a progressive power spectacle lens for presbyopia, and more particularly to a progressive power spectacle lens in which a power continuously changes between a distance portion and a near portion.

Conventionally, spectacle lenses are manufactured on request in accordance with specifications intrinsic to individual users. However, if a lens is manufactured from the beginning, various types of semi-finished lenses should be preliminarily prepared, and an appropriate one is selected and finished in accordance with the user's request. Typically, a semi-finished lens has a finished front surface, which has a progressive refraction power, and a back surface is formed to be a spherical surface of a toric surface depending on the user's request. In the specification, the front surface refers to a surface of the spectacle lens on an object side, and the back surface refers to a surface on an eye side.

The semi-finished lenses are divided, for example, into five groups having different ranges of vertex powers. Therefore, even though two spectacle lenses have different vertex power values, they might fall within the same group. In such a case, the same semi-finished lenses having the same front surfaces providing the same progressive refraction power are used, and the back surface is processed so as to meet the user's request. With this configuration, the number of moldings for the front surfaces providing the progressive power is reduced, thereby reducing a manufacturing cost.

Specifically, the vertex powers of the progressive power spectacle lenses (i.e., the spherical diopter SPH and the cylindrical diopter CYL) is divided into five value ranges, and only one type of semi-finished lens is prepared for each range. Therefore, even if two lenses having different vertex powers are required, if the vertex powers are included in the same range, the same type of the semi-finished lens is used for manufacturing the required lenses. Accordingly, the number of types of front surfaces providing the progressive power is limited, thereby decreasing the manufacturing cost.

FIGS. 23A–23C show ranges of vertex powers divided into groups I through V. FIG. 23A shows a minus range, FIG. 23B shows a plus range, and FIG. 23C shows a mixed range. A correspondence between the ranges and base curves (i.e., mean surface power at a distance reference point) of the semi-finished lenses are indicated in TABLE 1 below. For each range (i.e., group), a progressive power surface having a predetermined base curve is assigned. That is, for each range, a single semi-finished lens whose front surface has been processed to have a progressive power surface is assigned. It should be noted that the unit of measurement of the vertex power and base curve is D, diopter. TABLE 1 shows values when a refractive index is 1.60.

TABLE 1

| group | vertex power | base curve |
|---|---|---|
| I | −10.00 to −6.25 | 0.50 |
| II | −6.00 to −2.25 | 2.00 |
| III | −2.00 to +1.00 | 4.00 |
| IV | +1.25 to +3.00 | 5.00 |
| V | +3.25 to +6.00 | 6.00 |

The above division is determined so that an optical performance of a lens falls within an allowable range for all the vertex powers within a range when the front surface is formed to have a common progressive power surface for the range.

For example, for group II which covers the spherical surface power range of −6.00 D to −2.25 D, the base curve of a progressive power surface is determined to be 2.00 D. Using this semi-finished lens, in order to obtain a lens whose SHP is −4.00 D and CYL is −0.00 D, the back surface of the lens is processed to have a spherical surface of −6.00 D. If a lens whose SHP is −6.00 D and CYL is −2.00 D is required, the back surface is formed to be a toric surface of −8.00 D and −10.00 D.

According to the above-described conventional method, for the central values of the ranges, the lenses may exhibit excellent optical characteristics. However, since the design freedom for the rear surface is limited, the optical performances may be deteriorated for the values close to the extremities of the ranges. As a result, according to the conventional method, it is impossible to obtain the lens having the optimum performance for all the vertex powers within the range.

For example, when addition power ADD is 2.00 D, in a group III which covers the SPH range of −2.00 D to +1.00 D, a progressive power surface with a base curve of 4.00 D is used for all the vertex powers within the group. FIG. 21A shows a surface power D1$m$ (solid line) along a main meridian, on the progressive power surface, in a direction of the main meridian, and a surface power D1$s$ (broken line) along the main meridian in a direction perpendicular to the main meridian.

FIGS. 21B to 21D show a power Pm (solid line) in the main meridian direction and a power Ps (broken line) in the direction perpendicular to the main meridian direction based on as-worn evaluation (i.e., evaluation based on measurement of the optical characteristics in the as-worn position) of the progressive power spectacle lens having the vertex powers of −2.00 D, 0.00 D and +1.00 D, respectively, which are obtained by processing the rear surfaces of the lenses having the common progressive surface. The transmission performance is evaluated by varying an object distance from infinitive to 300 mm, at an origin to a near portion.

As shown in FIG. 21C, for the vertex power of 0.0 D which is the center of the range, an excellent performance without astigmatism can be obtained. However, for the vertex powers of −2.00 D and +1.00 D at both extremities of the range, the astigmatism is generated at the distance portion and the lower area of the near portion as shown in FIGS. 21B and 21D. In FIGS. 21A–21D, the performance on the main meridian is indicated. However, such deviation in performance affects the performance of the entire lens surface, which will be further discussed with reference to FIGS. 22A–22D.

FIGS. 22A–22D show a distribution of the power of the lens shown in FIGS. 21A–21D on the lens surface using contour lines. FIG. 22A shows a surface performance of the progressive power surface which is a common front surface of lenses falling in group III. The left-hand side circle shows a surface astigmatism ASD of a surface defined by |D1$m$(Y)−D1$s$(Y)|, and the right-hand side circle shows a mean surface power APD defined by (D1$m$(Y)+D1$s$(Y))/2.

FIGS. 22B–22D shows performances of the progressive power spectacle lenses having the vertex diopter values of −2.00 D, 0.00 D and +1.00 D, respectively, using the transmission evaluation. In each figure, the left-hand side circle shows a distribution of astigmatism AS, and the right-hand side circle shows a distribution of average power AP.

It is understood by comparing the performances of FIGS. 22B and 22D with FIG. 22C, which corresponds to the center of the range, that for the extremity vertex powers −2.00 D and +1.00 D of the range, an area of distinct vision in which the astigmatism is less than a predetermined value is narrower both in the distance portion and near portion.

SUMMARY OF THE INVENTION

The present invention is advantageous in that a method is provided for manufacturing a progressive power spectacle lens which exhibits an excellent optical performance for all the vertex diopter values.

According to an embodiment of the invention, there is provided a method of manufacturing a progressive power spectacle lens, which includes dividing predetermined available vertex powers into a plurality of vertex power groups, forming one surface of a spectacle lens as a common surface for the vertex powers within each of the plurality of vertex power groups, and forming an opposite surface of the spectacle lens as a progressive power surface in accordance with a desired vertex power.

According to the method, since the progressive power surface is formed in accordance with the desired vertex power, a spectacle lens having an excellent optical performance without astigmatism can be obtained regardless of the desired vertex power.

In a preferred embodiment, a spectacle lens has a front surface on an object side and a back surface on a eye side, and the front surface is formed as the common surfaces for respective vertex power groups.

Optionally, the common surface is a spherical surface. Alternatively, the common surface may be an aspherical surface.

In the method described above, distributions of at least one of astigmatism and mean power of spectacle lenses within a same group and having different vertex powers are substantially similar to each other.

In a particular case, condition:

$$D1m_i(Y) \neq D1m_j(Y)$$

is satisfied for at least one value Y, which represents a distance from a fitting point in a direction of a main meridian of the progressive power surface. It should be noted that $D1m(Y)$ represents a surface power in a direction of a main meridian of the progressive power surface of the spectacle lens, subscripts i and j indicating the spectacle lenses having different vertex powers in the same group.

Optionally, condition:

$$D1m_i(Y) - D1s_i(Y) \neq D1m_j(Y) - D1s_j(Y)$$

is satisfied for at least one value Y, which represents a distance from a fitting point. It should be noted that $D1m(Y)$ represents a surface power in a direction of a main meridian of the progressive power surface of the spectacle lens, subscripts i and j indicating the spectacle lenses having different vertex powers in the same group, Y being a distance from a fitting point, and $D1s(Y)$ represents a surface power, in the direction perpendicular to the main meridian.

Further optionally, condition:

$$D2m_i(Y) = D2m_j(Y)$$

is satisfied for all values of Y, Y being a distance on the one surface, along a line where the one surface intersects with a plane including an optical axis of the spectacle lens, from an optical axis that passes a fitting point and a center of an eyeball. It should be noted that $D2m(Y)$ represents a surface power of the one surface of the spectacle lens, subscripts i and j indicating the spectacle lenses having different vertex powers in the same group.

In this case, it is preferable that condition:

$$D2m_i(Y) = D2m_j(Y) = D2m_i(0) = D2m_j(0)$$

is satisfied for all Y of each of the one surfaces. If the condition is satisfied, the one surface can be formed relatively easily.

Further optionally, condition:

$$ASD_i(Y) > ASD_j(Y)$$

is satisfied for a value Y which represents a distance from a fitting point. In this case, $Y \leq -15$ mm, and $P_i > P_j > -3.00$, $P_i$ and $P_j$ representing the vertex powers at the distance reference points of spectacle lenses having different vertex powers, respectively, subscripts i and j indicating values for the spectacle lenses having different vertex powers in the same group. ASD(Y) represents the surface astigmatism defined as $|D1m(Y) - D1s(Y)|$ at the distance Y, $D1m(Y)$ representing a surface power in a direction of a main meridian of the progressive power surface of the spectacle lens, $D1s$ representing a surface power in a direction perpendicular to the main meridian of the progressive power surface of the spectacle lens.

Still optionally, condition:

$$ASD_i(Y) > ASD_j(Y)$$

is satisfied for a value Y which represents a distance from a fitting point. In this case, $Y \leq -15$ mm, and $P_i > P_j > +2.00$, $P_i$ and $P_j$ representing the vertex powers at the distance reference points of spectacle lenses having different vertex powers, respectively, subscripts i and j indicating values for the spectacle lenses having different vertex powers in the same group. ASD(Y) represents the surface astigmatism defined as $|D1m(Y) - D1s(Y)|$ at the distance Y, $D1m(Y)$ representing a surface power in a direction of a main meridian of the progressive power surface of the spectacle lens, $D1s$ representing a surface power in a direction perpendicular to the main meridian of the progressive power surface of the spectacle lens.

Still optionally, condition:

$$ASD_i(Y) > ASD_j(Y)$$

is satisfied for a value Y which represents a distance from a fitting point, subscripts i and j indicating values for the spectacle lenses having different vertex powers in the same group. In this case, $Y \geq +5$ mm, and $P_i > P_j > +2.00$, $P_i$ and $P_j$ representing the vertex powers at the distance reference points of spectacle lenses having different vertex powers, respectively. ASD(Y) represents the surface astigmatism defined as $|D1m(Y) - D1s(Y)|$ at a distance Y from the fitting point, $D1m(Y)$ representing a surface power in a direction of a main meridian of the progressive power surface of the spectacle lens, $D1s$ representing a surface power in a direction perpendicular to the main meridian of the progressive power surface of the spectacle lens.

Further optionally, condition:

$$\Delta APD_i(Y) > \Delta APD_j(Y)$$

is satisfied for a value Y which represents a distance from a fitting point, subscripts i and j indicating values for the spectacle lenses having different vertex powers in the same group. In this case, Y>0 mm, and $P_i > P_j > +2.00$, $P_i$ and $P_j$ representing the vertex powers at the distance reference points of spectacle lenses having different vertex powers, respectively. $\Delta APD(Y)$ represents a change of mean surface power APD(Y), the mean surface power APD(Y) being defined by $(D1m(Y)+D1s(Y))/2$, $D1m(Y)$ representing a surface power in a direction of a main meridian of the progressive power surface of the spectacle lens, D1s representing a surface power in a direction perpendicular to the main meridian of the progressive power surface of the spectacle lens, the change of mean surface power being defined such that $\Delta APD(Y) = |APD(Y) - APD(0)|$.

According to the embodiment, a spectacle lens is provided. The spectacle lens has a front surface which has a predetermined shape vertex powers within a predetermined range, the lens having a back surface which has a progressive power surface to be formed in accordance with a desired vertex power within the predetermined range.

According to the embodiment, a spectacle lens manufacturing system is provided, which manufactures a progressive power spectacle lens in accordance with a manufacturing method, the method includes dividing possible vertex powers into a plurality of vertex power groups, forming one surface of a spectacle lens as a common surface for the vertex powers within each of the plurality of vertex power groups, and forming an opposite surface of the spectacle lens as a progressive power surface in accordance with a desired vertex power.

According to the embodiment, there is provided a method of designing a progressive power spectacle lens, which includes dividing possible vertex powers into a plurality of vertex power groups, one surface of a spectacle lens being formed as a common surface for the vertex powers within each of the plurality of vertex power groups, and designing an opposite surface of the spectacle lens as a progressive power surface in accordance with a desired vertex power.

BRIEF DESCRIPTION OF THE ACCOMPANYING DRAWINGS

FIG. 21A is a graph showing surface power of a conventional progressive power spectacle lens;

FIGS. 21B–21D are graphs showing powers, based on as-worn evaluation, of conventional progressive power spectacle lenses having different vertex powers, respectively;

FIGS. 23A–23C show a relationship between groups I–V and vertex powers of a progressive power spectacle lens.

DETAILED DESCRIPTION OF THE EMBODIMENTS

Hereinafter, a method of manufacturing a spectacle lens according to an embodiment of the invention will be described with reference to the accompanying drawings.

Figure 1A:
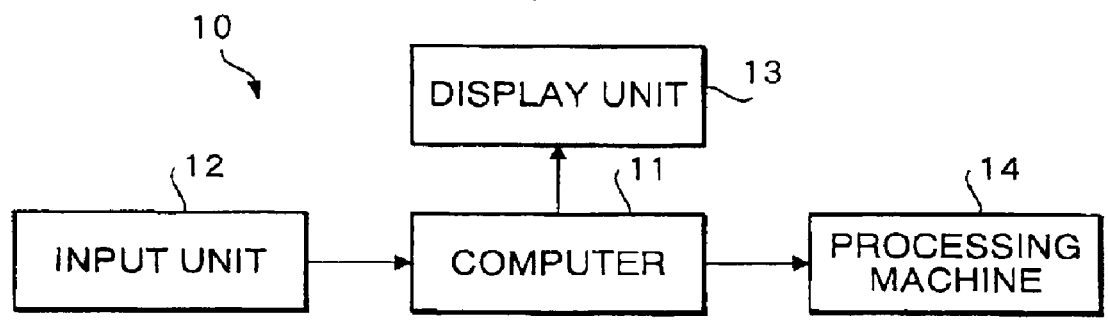
FIG. 1A is a block diagram showing a manufacturing system of a spectacle lens according to an embodiment of the invention.

FIG. 1A shows a block diagram of a spectacle lens manufacturing system 10 according to an embodiment of the invention. The manufacturing system 10 includes a computer 11, an input unit 12 connected to the computer 11, a display unit 13 connected to the computer 11 and a processing machine 14.

According to the embodiment, a spectacle lens is provided as a semi-finished lens, one surface of which has been processed to form a predetermined surface. Using the processing machine 14, the opposite surface of the spectacle lens is processed to form a progressive power surface in accordance with a desired specification.

The method of manufacturing a spectacle lens according to the embodiment is stored as the manufacturing program, for example, in a ROM inside the computer 11. The computer 11 executes the manufacturing program to perform the manufacturing method. The input unit 12 is provided with input devices such as a keyboard for inputting data in the computer 11. The display unit 13 includes, for example, a CRT which displays various data for performing the manufacturing method with the computer 11. The processing machine 14 is controlled by the computer 11 to form the progressive power surface on the semi-finished lens.

Figure 1B:
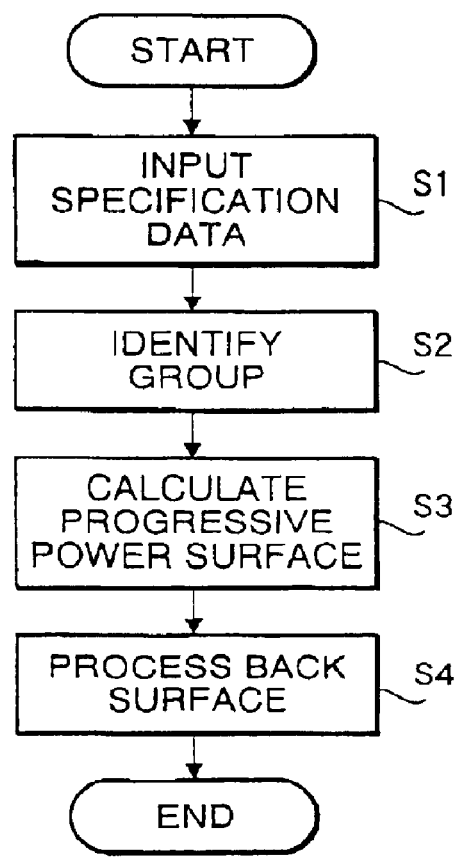
FIG. 1B is a flowchart illustrating a manufacturing procedure.

FIG. 1B is a flowchart illustrating the method of manufacturing a spectacle lens to be performed with the manufacturing system 10 shown in FIG. 1A.

When an order is placed by a customer, a progressive power spectacle lens is manufactured in a manufacturing facility in accordance with a procedure shown in FIG. 1B. Firstly, an operator inputs a specification of an ordered spectacle lens in the computer 11 through the input unit 12 (S1). The specification may include vertex powers (spherical power SPH, cylindrical power CYL for curing an astigmatic vision), addition power ADD, type of product (e.g., refractive index of lens material). Alternatively or optionally, the data may be input through a terminal at a remote place, e.g., at an optician, and may be transmitted to the manufacturing system 10 via a network system.

The computer 11 identifies a vertex power group based on the vertex power of the specification, and identifies a semi-finished lens corresponding to the identified group (S2). It should be noted that the lenses categorized in the same group have the same front surface. In the manufacturing facility, the spectacle lenses whose front surfaces have been processed to have spherical surfaces or aspherical surfaces are preliminary stocked as semi-finished lenses. According to the embodiment, the division of groups of the vertex powers is similar to the conventional one. That is, the vertex powers are divided into five groups as indicated in FIGS. 23A–23C and TABLE 1.

When the semi-finished lens is identified, the computer 11 designs the back surface of the identified lens, which is to have a progressive power, based on the specification and data of the identified semi-finished lens data, using a surface designing program (S3). The surface designing program utilizes a well-known optimizing algorithm such as the damped least square method, and obtains surface shape data which realizes the required vertex power and an optimum optical performance.

The operator sets the identified semi-finished lens in the surface processing machine 14, and inputs a command to start processing of the lens surface through the input unit 12. Then, the computer 11 controls, based on the surface shape data obtained in step S3, the surface processing machine 14 to process (grind) the back surface of the semi-finished lens (S4).

Figure 2:
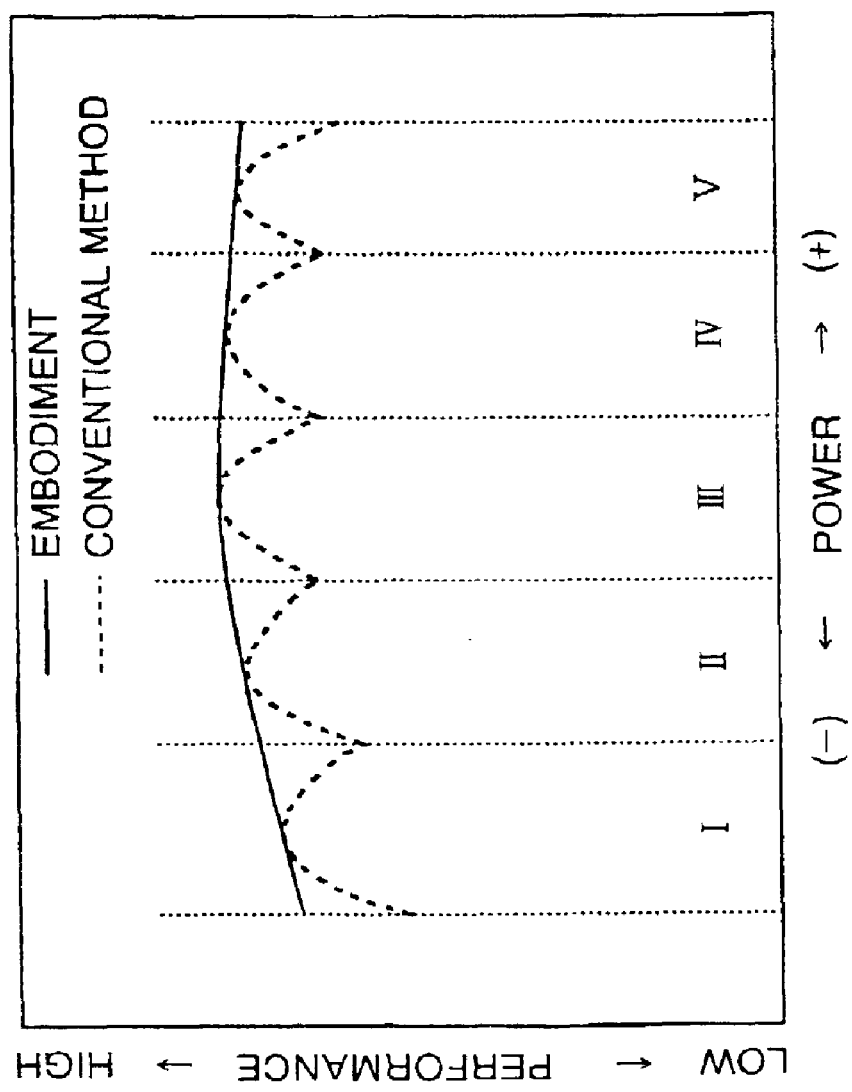
FIG. 2 is a graph schematically illustrating variation of optical performances of a conventional lens and the lens according to the embodiment.

FIG. 2 is a chart schematically shows an optical performance of the progressive power spectacle lens for usable vertex powers. In FIG. 2, solid line represents the performance of the spectacle lens manufactured by the method according to the embodiment, and broken lines represent performances of the spectacle lenses manufactured by a conventional method.

According to the spectacle lens manufactured in accordance with the conventional method, an excellent performance is realized at a central area in each of groups I–V. However, at the extremities of each group, the optical performance is lowered. In contrast, the spectacle lens manufactured by the method according to the embodiment, since the progressive power surface is determined based on the vertex power, an excellent optical performance is achieved for all the vertex powers.

Hereinafter, concrete examples of progressive power spectacle lenses manufactured in accordance with the method according to the embodiment will be described.

In the concrete examples, it is assumed that a refractive index is 1.6, an outer diameter of the lens is 70 mm, base curves (paraxial surface power of the front surface) are identical to those indicated in TABLE 1. According to the embodiment, as described above, by processing the back surface of a semi-finished lens in accordance with the vertex power, a finished lens is provided.

FIGS. 3A–7F show optical performances of progressive power spectacle lenses according to the embodiment of the invention, where the cylindrical power CYL is 0.00 D and additional power ADD is 1.00 D. Specifically, in the drawings, those labeled with A–C (i.e., FIGS. 3A–3C, 4A–4C, 5A–5C, 6A–6C and 7A–7C) show surface powers D1m (solid line) in the direction of main meridian and surface powers D1s (broken lines) in the direction perpendicular to the main meridian, along the main meridian of the progressive power surfaces for minimum value, intermediate value and maximum value of vertex power SPH in each group. It should be noted that FIGS. 3A–3C, 4A–4C, 5A–5C, 6A–6C and 7A–7C correspond to groups I–V, respectively. Drawings labeled with D–F (i.e., FIGS. 3D–3F, 4D–4F, 5D–5F, 6D–6F and 7D–7F) show power Pm (solid line) in the direction of main meridian and power Ps (broke lines) in the direction perpendicular to the main meridian, along the main meridian, of the spectacle lenses corresponding to those shown in FIGS. 3A–3C, 4A–4C, 5A–5C, 6A–6C and 7A–7C, respectively, based on the as-worn evaluation. The transmission performance is evaluated by changing an object distance from infinite to 300 mm for an origin (i.e., a fitting point) to a near portion of the spectacle lens.

Figure 3A:
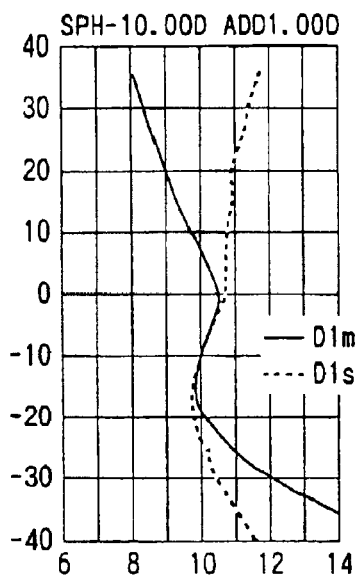
FIGS. 3A–3C are graphs showing surface power of a progressive power spectacle lens in group I, addition power of 1.00 D.
Figure 3B:
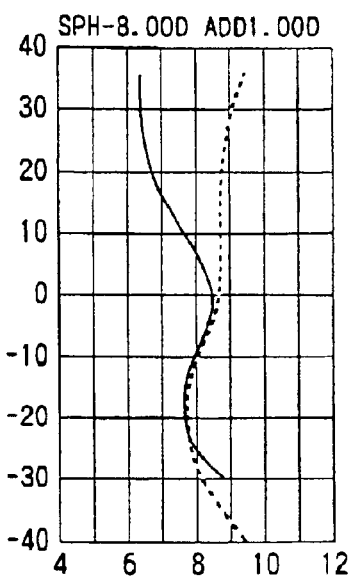
Figure 3C:
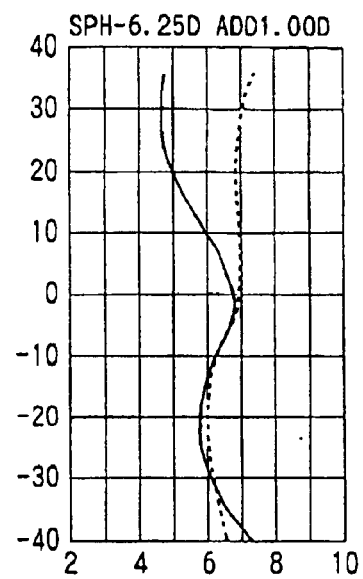
Figure 3D:
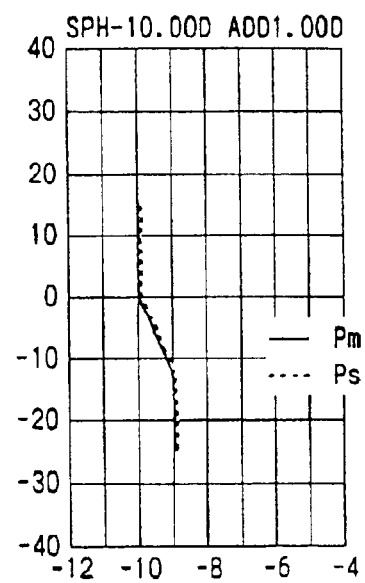
FIGS. 3D–3F are graphs showing powers based on as-worn evaluation.
Figure 3E:
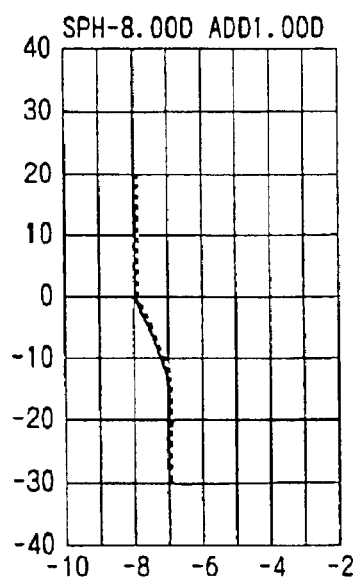
Figure 3F:
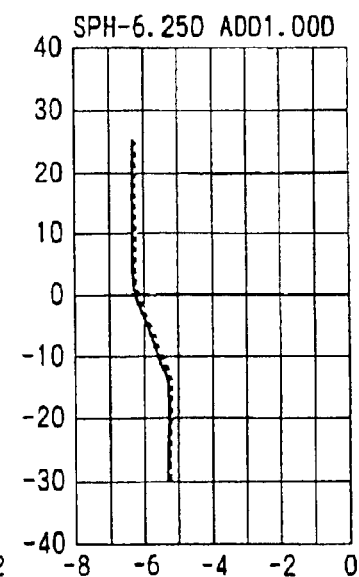

FIGS. 3A, 3B and 3C show surface powers of progressive power surfaces of spectacle lenses for vertex powers SHP of −10.00 D, −8.00 D and −6.25 D included in group I (SHP of −10.00 D through −6.25 D).

Figure 4A:
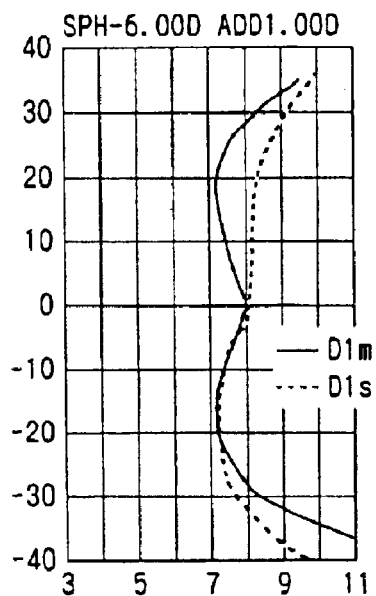
FIGS. 4A–4C are graphs showing surface power of a progressive power spectacle lens in group II, addition power of 1.00 D.
Figure 4B:
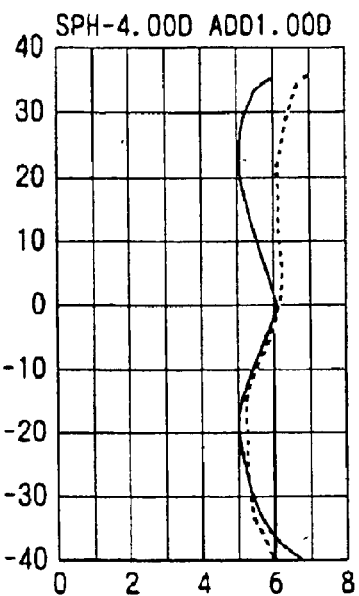
Figure 4C:
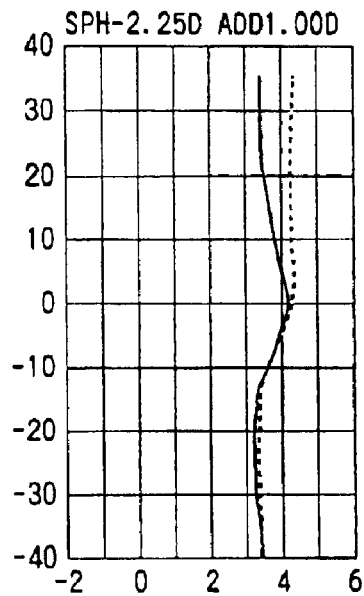
Figure 4D:
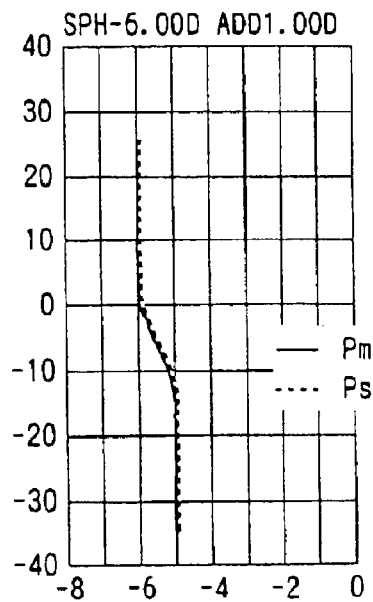
FIGS. 4D–4F are graphs showing powers based on as-worn evaluation.
Figure 4E:
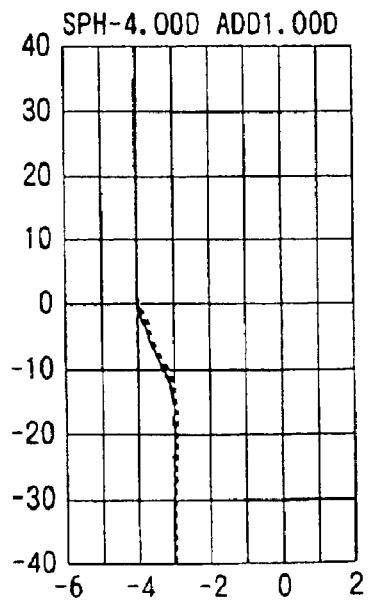
Figure 4F:
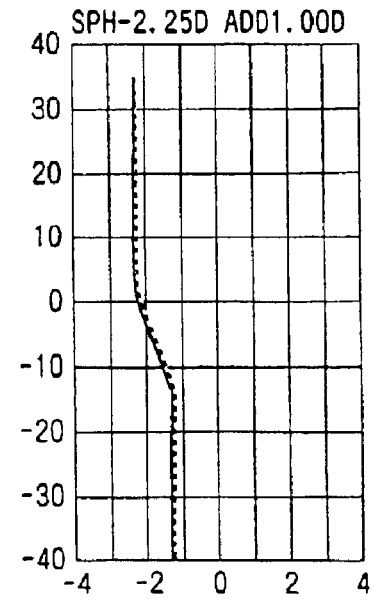

FIGS. 4A, 4B and 4C show surface powers of progressive power surfaces of spectacle lenses for vertex powers SHP of −6.00 D, −4.00 D and −2.25 D included in group II (SHP of −6.00 D through −2.25 D).

Figure 5A:
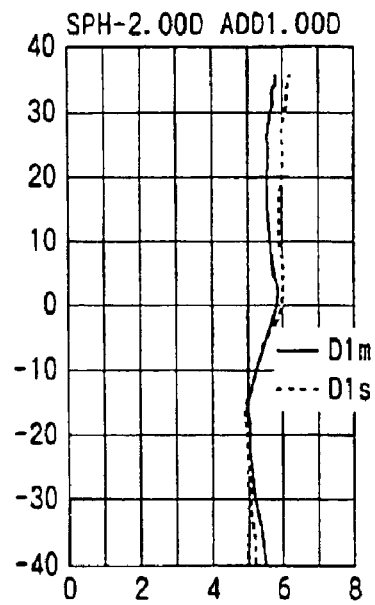
FIGS. 5A–5C are graphs showing surface power of a progressive power spectacle lens in group III, addition power of 1.00 D.
Figure 5B:
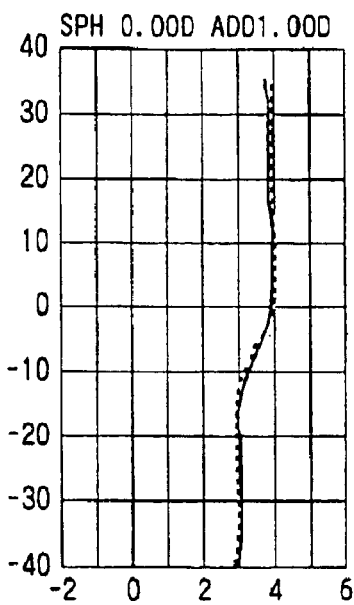
Figure 5C:
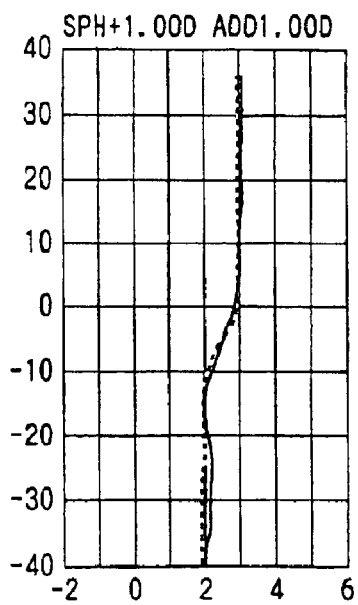
Figure 5D:
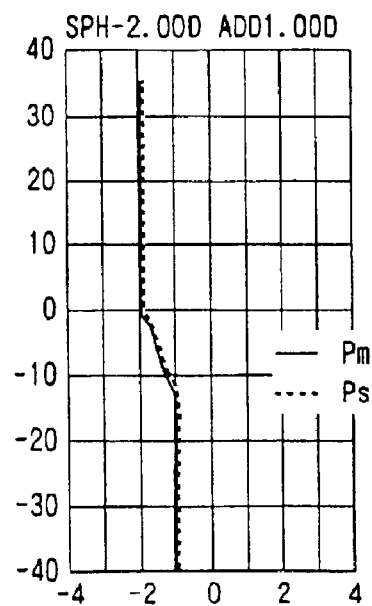
FIGS. 5D–5F are graphs showing powers based on as-worn evaluation.
Figure 5E:
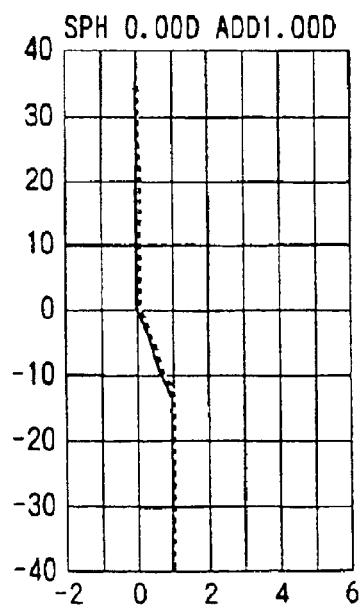
Figure 5F:
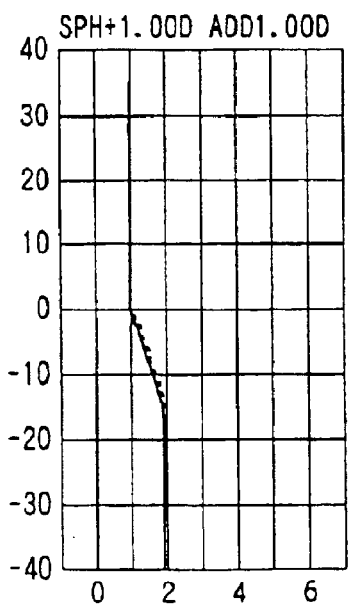

FIGS. 5A, 5B and 5C show surface powers of progressive power surfaces of spectacle lenses for vertex powers SHP of −2.00 D, 0.00 D and +1.00 D included in group III (SHP of −2.00 D through +1.00 D).

Figure 6A:
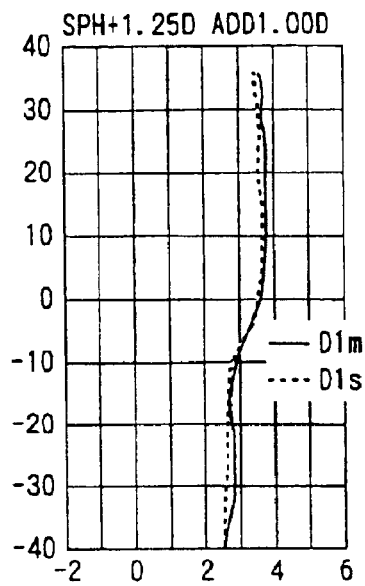
FIGS. 6A–6C are graphs showing surface power of a progressive power spectacle lens in group IV, addition power of 1.00 D.
Figure 6B:
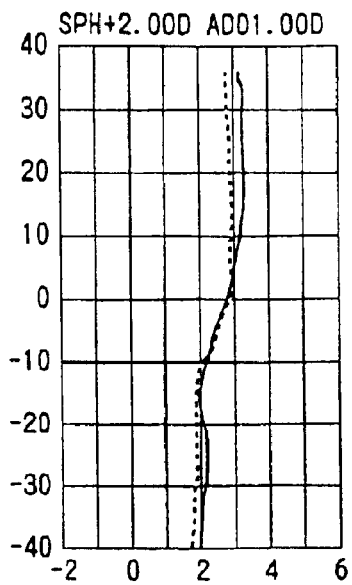
Figure 6C:
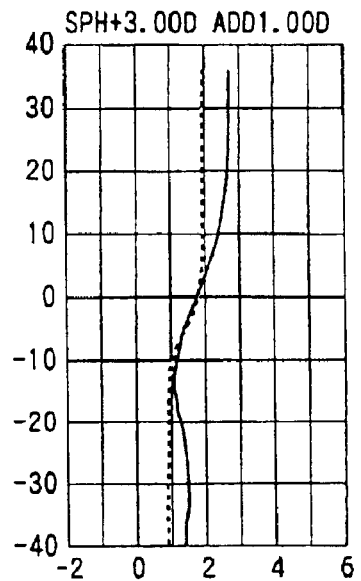
Figure 6D:
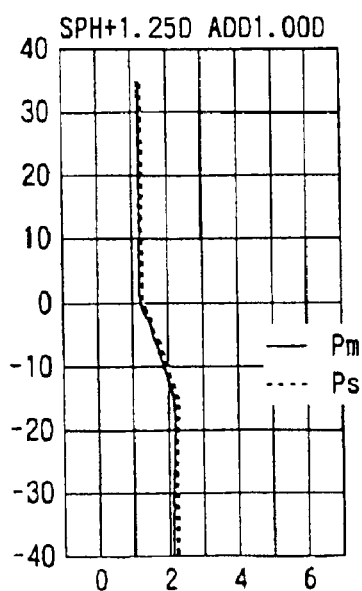
FIGS. 6D–6F are graphs showing powers based on as-worn evaluation.
Figure 6E:
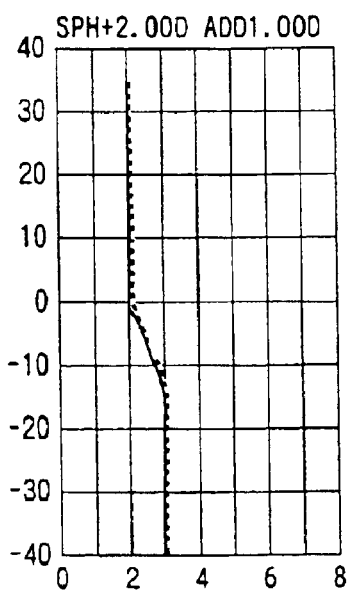
Figure 6F:
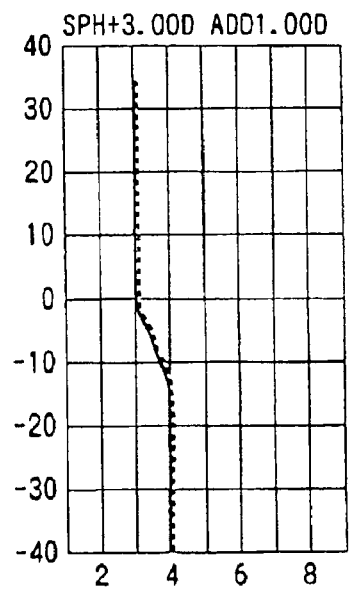

FIGS. 6A, 6B and 6C show surface powers of progressive power surfaces of spectacle lenses for vertex powers SHP of +1.25 D, +2.00 D and +3.00 D included in group IV (SHP of +1.25 D through +3.00 D).

Figure 7A:
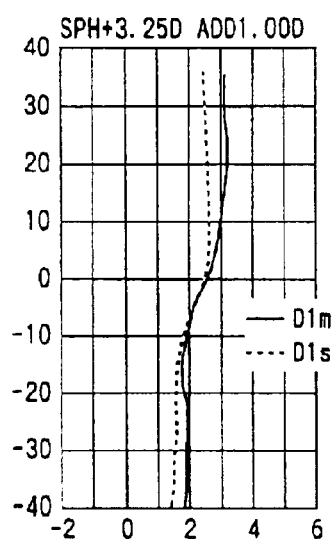
FIGS. 7A–7C are graphs showing surface power of a progressive power spectacle lens in group V, addition power of 1.00 D.
Figure 7B:
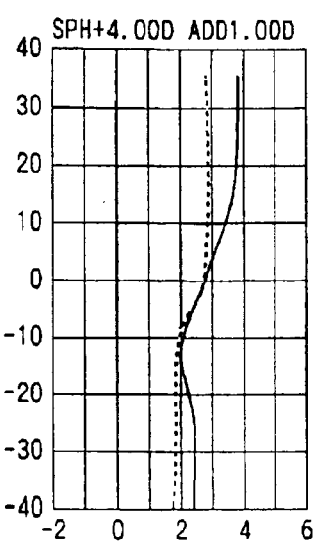
Figure 7C:
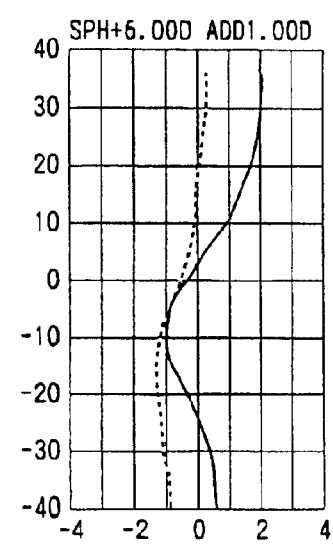
Figure 7D:
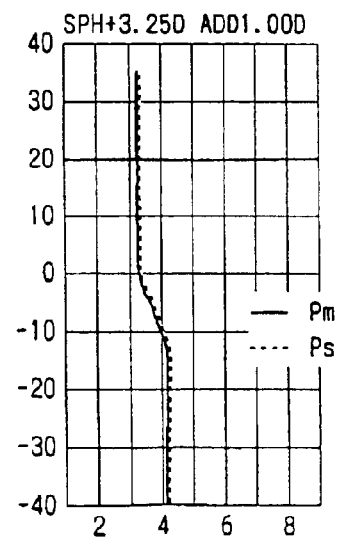
FIGS. 7D–7F are graphs showing powers based on as-worn evaluation.
Figure 7E:
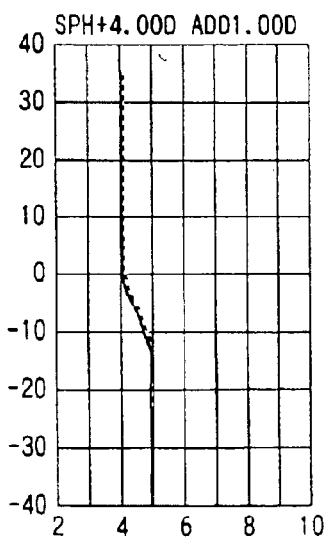
Figure 7F:
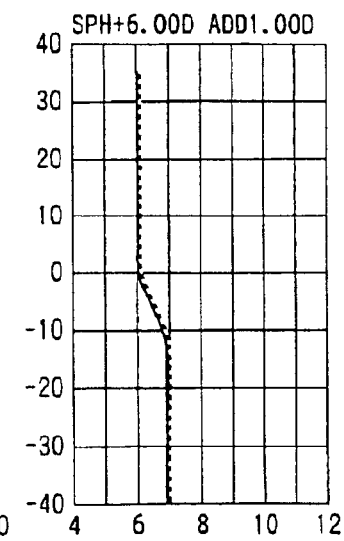
Figure 8A:
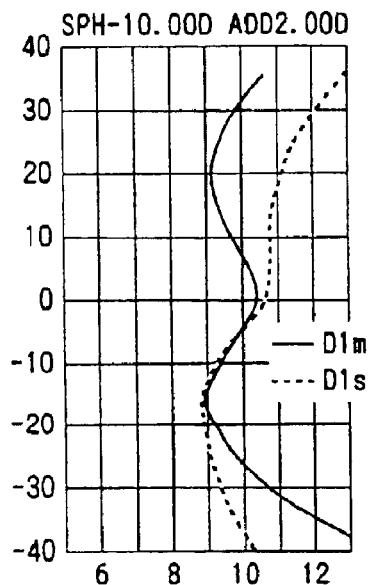
FIGS. 8A–8C are graphs showing surface power of a progressive power spectacle lens in group I, addition power of 2.00 D.
Figure 8B:
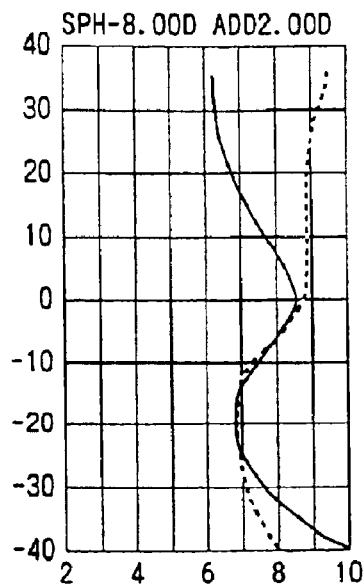
Figure 8C:
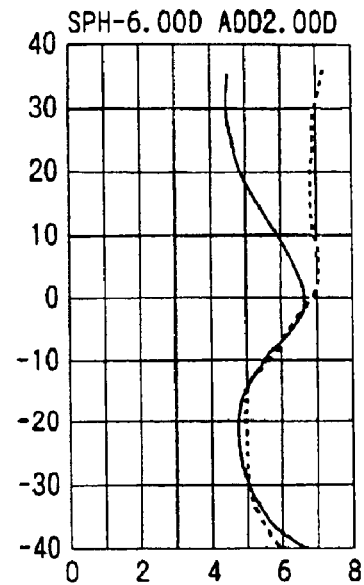
Figure 8D:
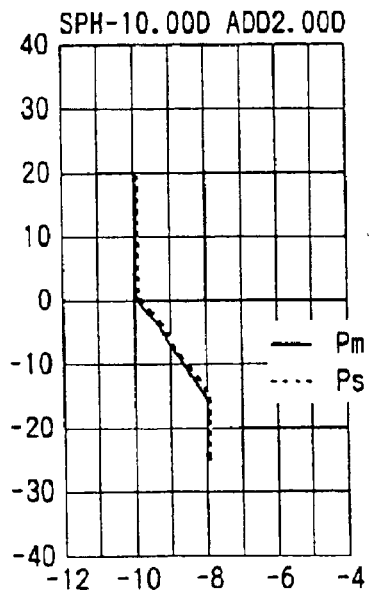
FIGS. 8D–8F are graphs showing powers based on as-worn evaluation.
Figure 8E:
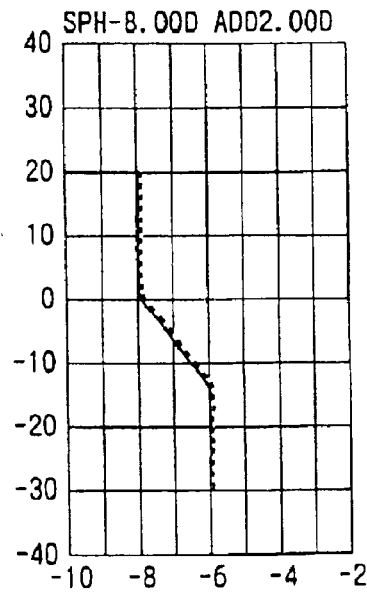
Figure 8F:
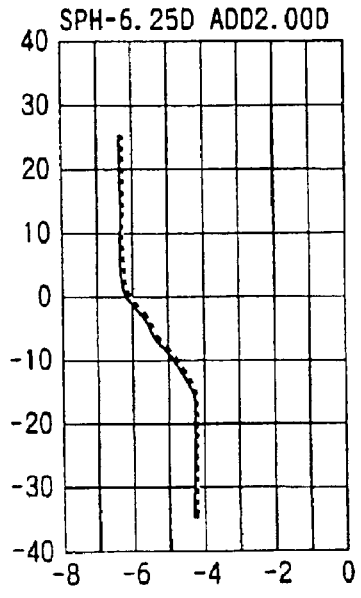
Figure 9A:
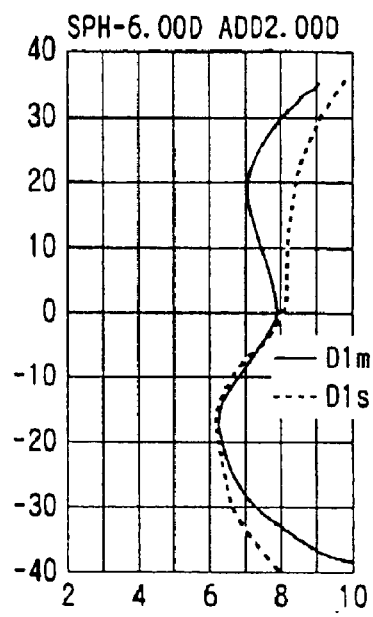
FIGS. 9A–9C are graphs showing surface power of a progressive power spectacle lens in group II, addition power of 2.00 D.
Figure 9B:
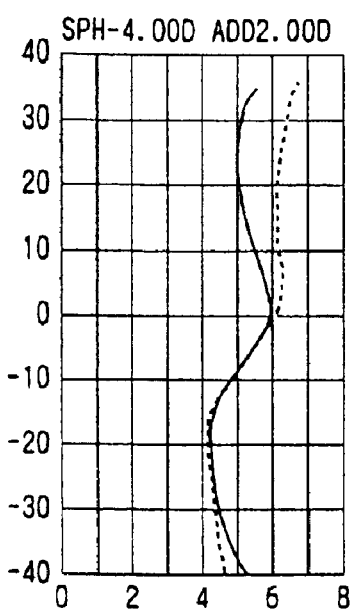
Figure 9C:
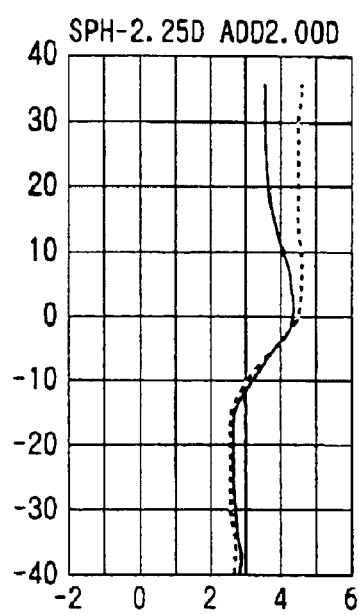
Figure 9D:
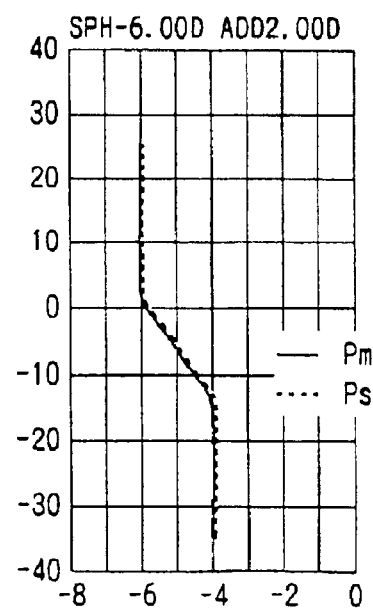
FIGS. 9D–9F are graphs showing powers based on as-worn evaluation.
Figure 9E:
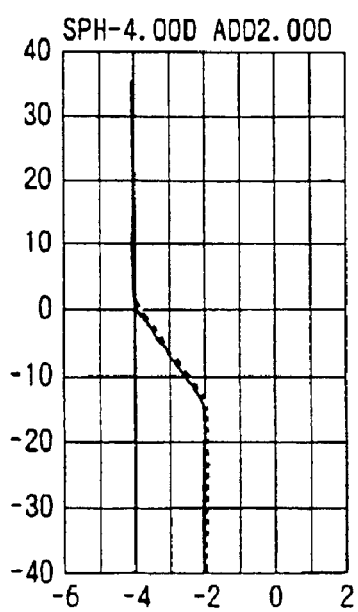
Figure 9F:
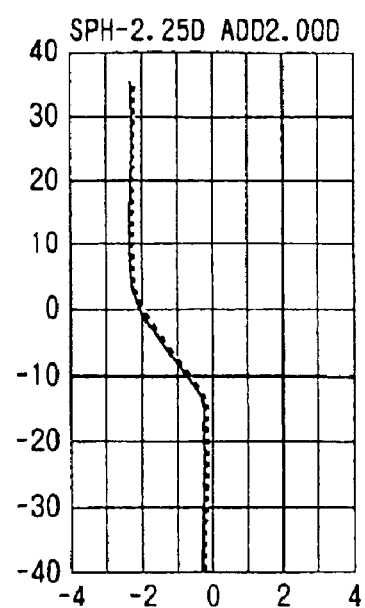
Figure 10A:
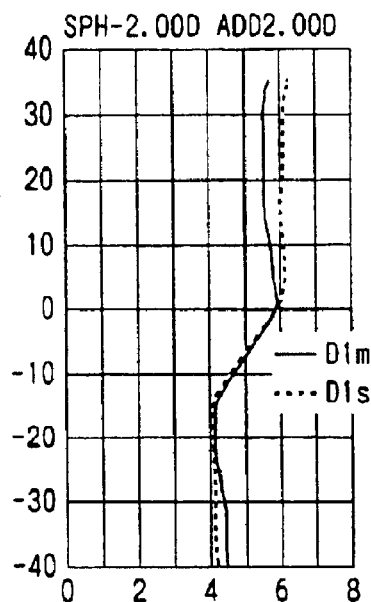
FIGS. 10A–10C are graphs showing surface power of a progressive power spectacle lens in group III, addition power of 2.00 D.
Figure 10B:
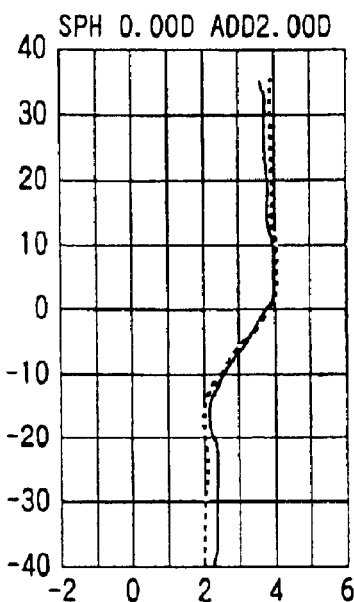
Figure 10C:
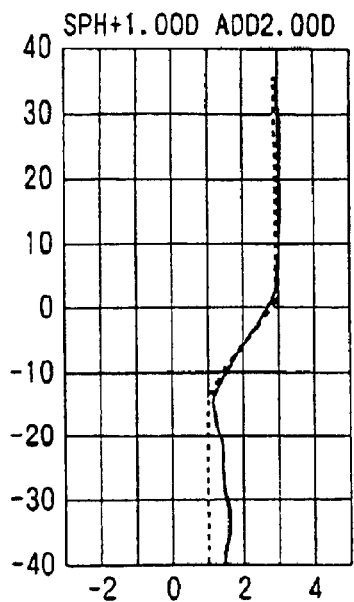
Figure 10D:
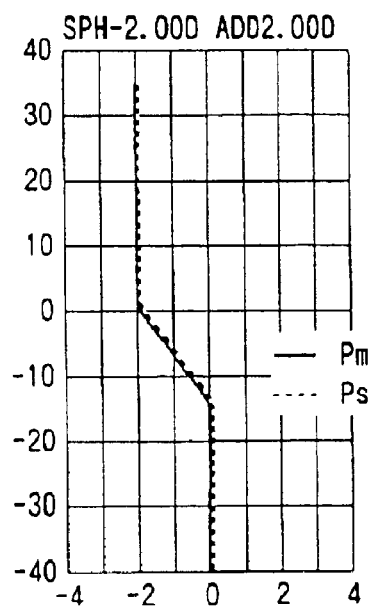
FIGS. 10D–10F are graphs showing powers based on as-worn evaluation.
Figure 10E:
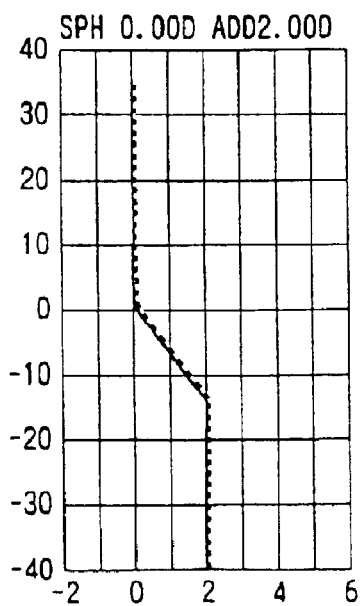
Figure 10F:
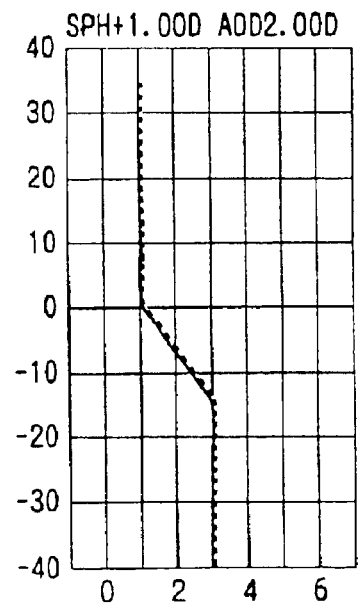
Figure 11A:
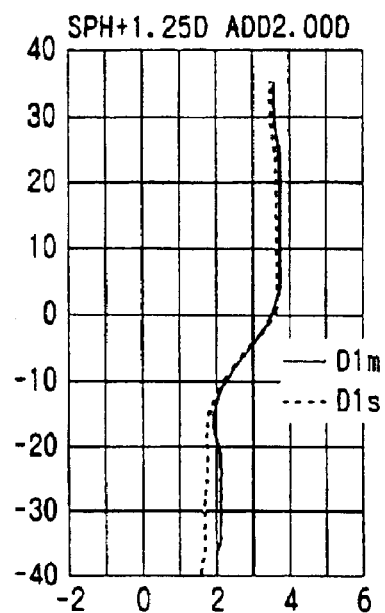
FIGS. 11A–11C are graphs showing surface power of a progressive power spectacle lens in group IV, addition power of 2.00 D.
Figure 11B:
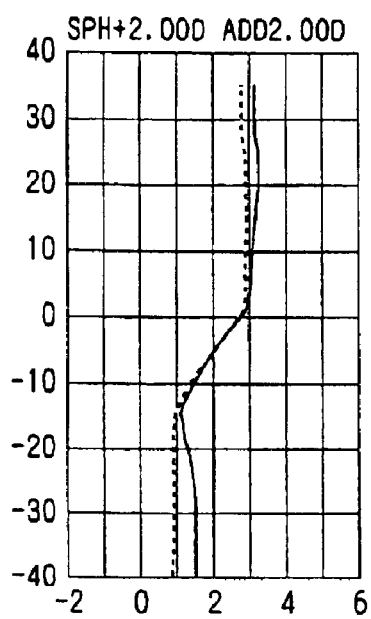
Figure 11C:
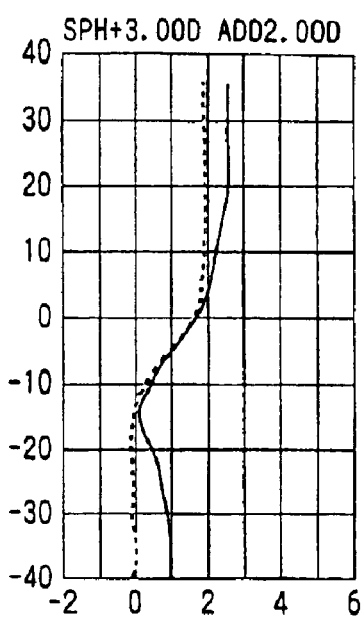
Figure 11D:
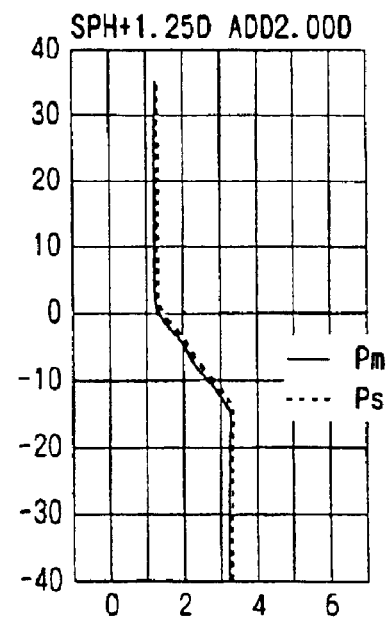
FIGS. 11D–11F are graphs showing powers based on as-worn evaluation.
Figure 11E:
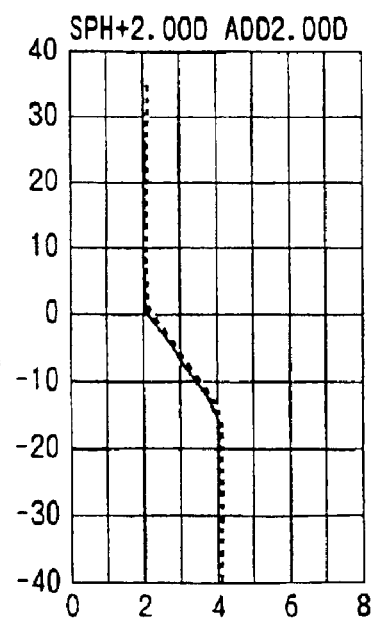
Figure 11F:
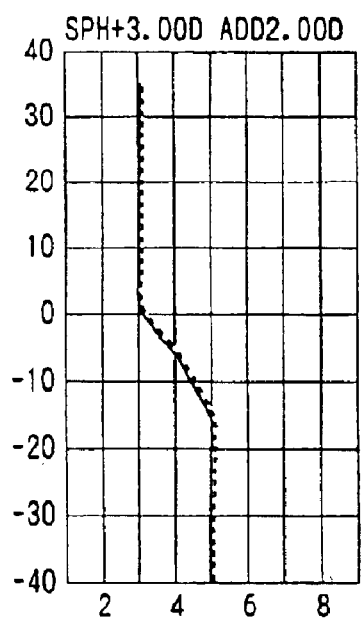
Figure 12A:
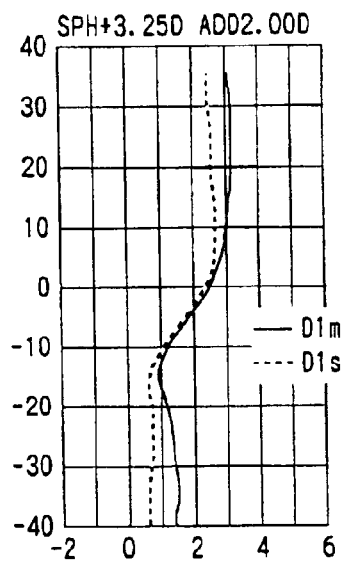
FIGS. 12A–12C are graphs showing surface power of a progressive power spectacle lens in group V, addition power of 2.00 D.
Figure 12B:
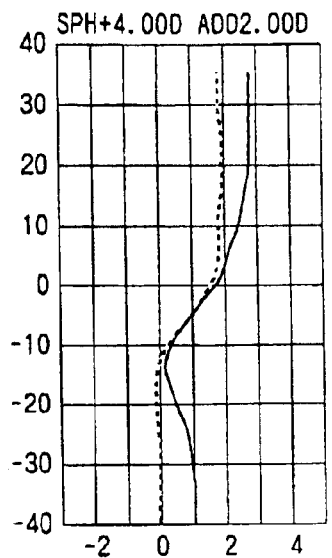
Figure 12C:
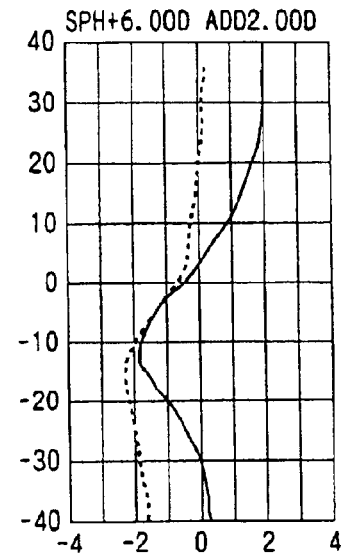
Figure 12D:
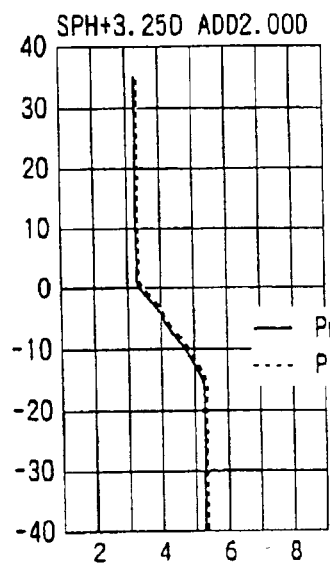
FIGS. 12D–12F are graphs showing powers based on as-worn evaluation.
Figure 12E:
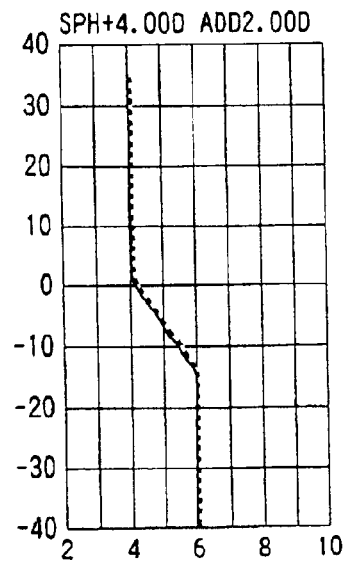
Figure 12F:
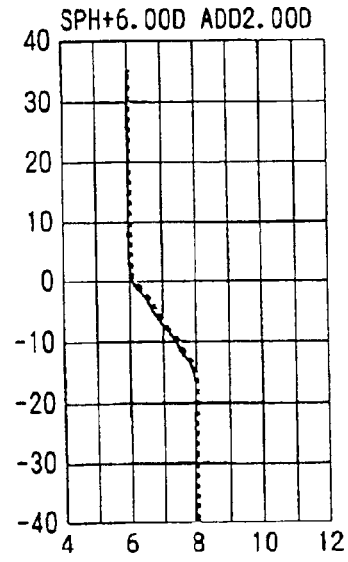
Figure 13A:
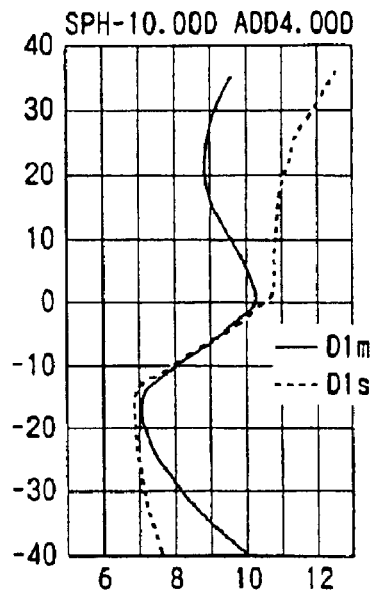
FIGS. 13A–13C are graphs showing surface power of a progressive power spectacle lens in group I, addition power of 4.00 D.
Figure 13B:
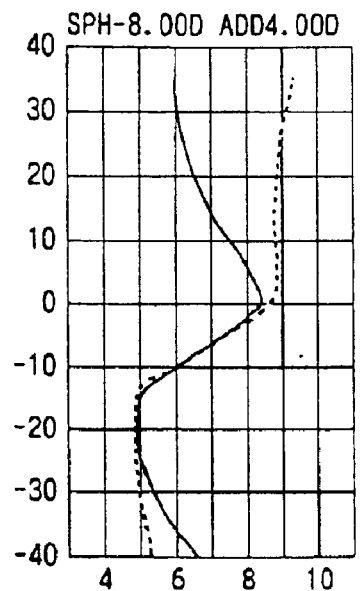
Figure 13C:
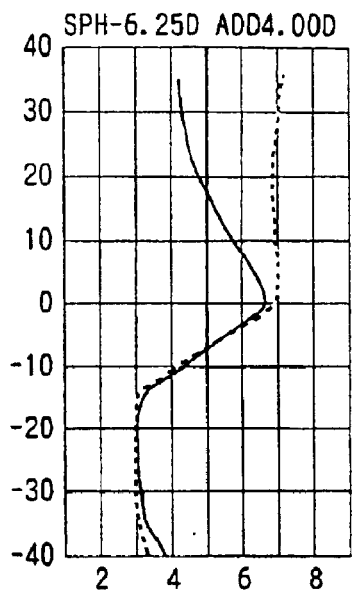
Figure 13D:
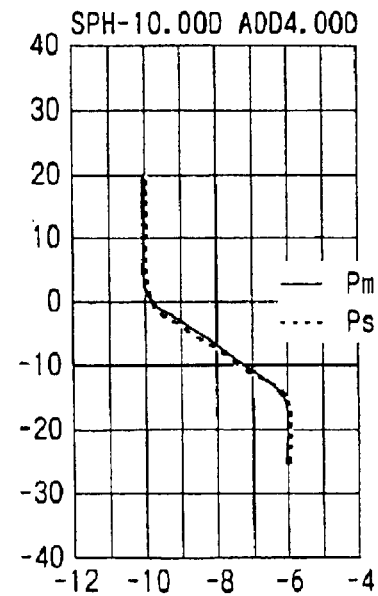
FIGS. 13D–13F are graphs showing powers based on as-worn evaluation.
Figure 13E:
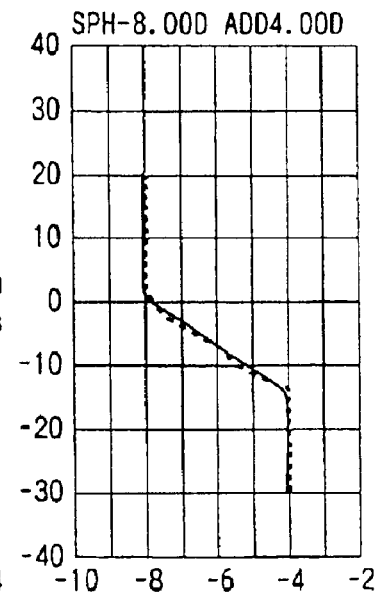
Figure 13F:
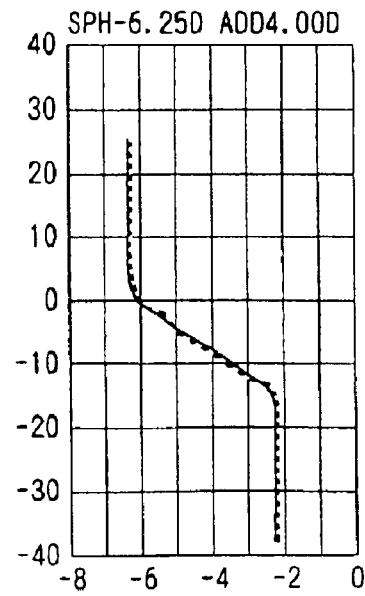
Figure 14A:
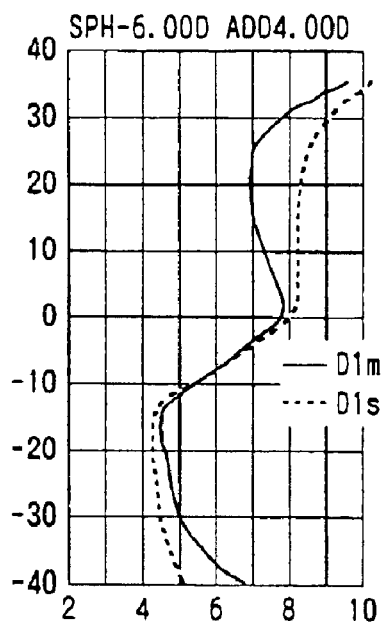
FIGS. 14A–14C are graphs showing surface power of a progressive power spectacle lens in group II, addition power of 4.00 D.
Figure 14B:
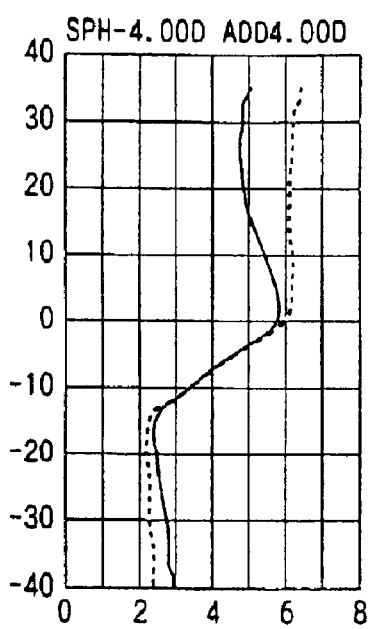
Figure 14C:
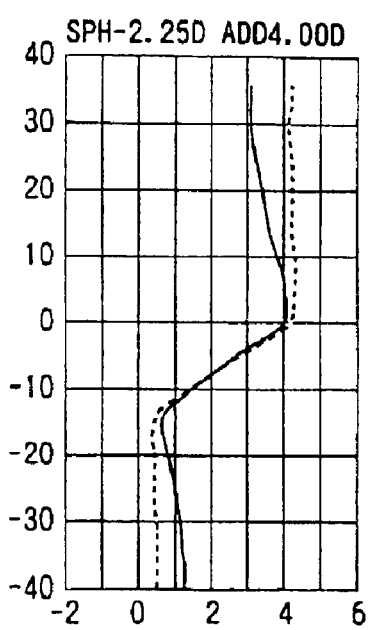
Figure 14D:
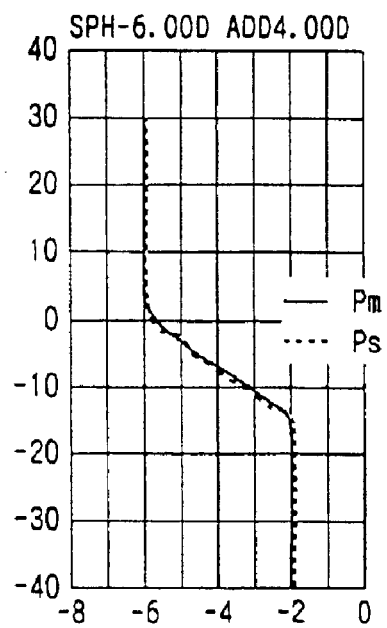
FIGS. 14D–14F are graphs showing powers based on as-worn evaluation.
Figure 14E:
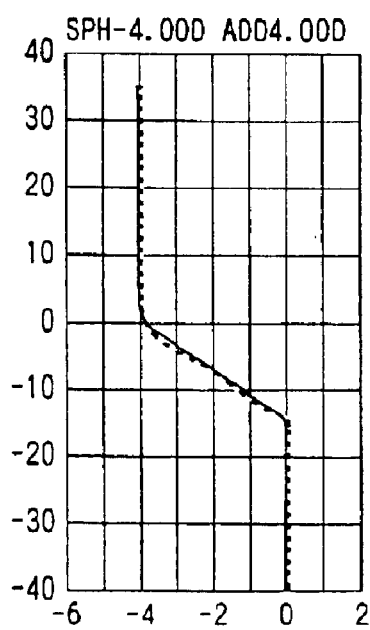
Figure 14F:
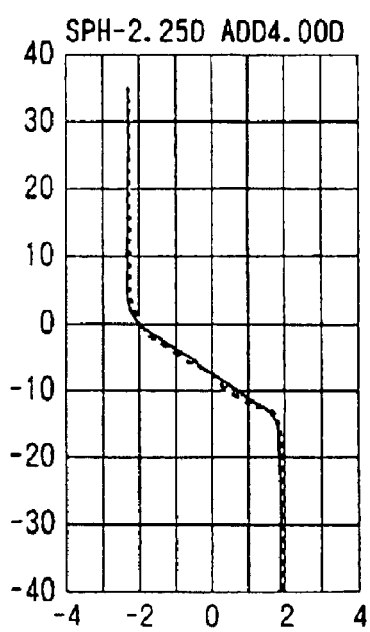
Figure 15A:
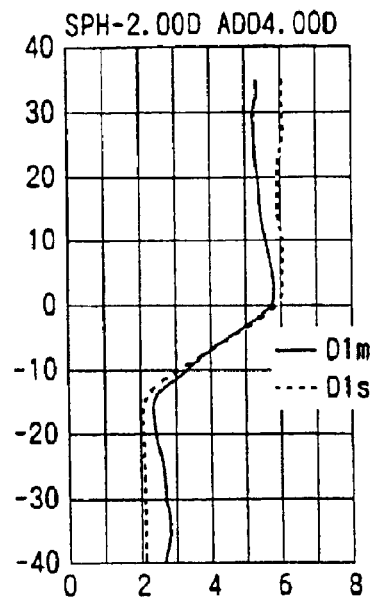
FIGS. 15A–15C are graphs showing surface power of a progressive power spectacle lens in group III, addition power of 4.00 D.
Figure 15B:
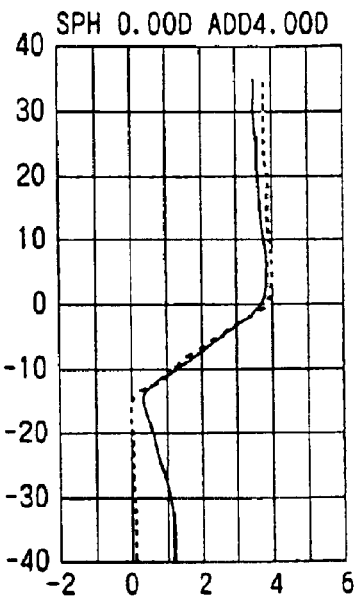
Figure 15C:
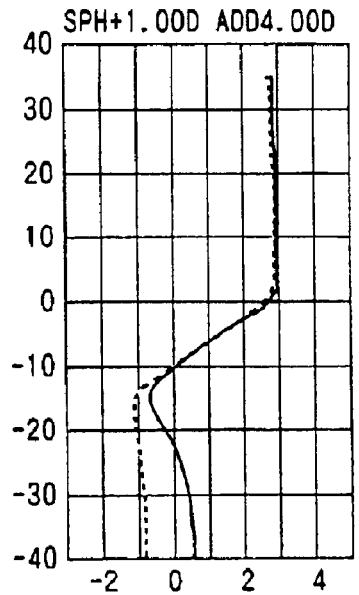
Figure 15D:
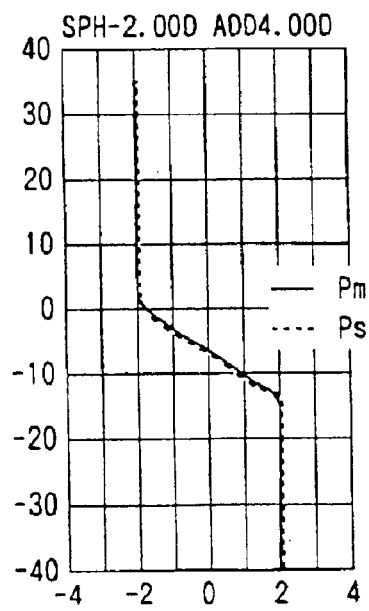
FIGS. 15D–15F are graphs showing powers based on as-worn evaluation.
Figure 15E:
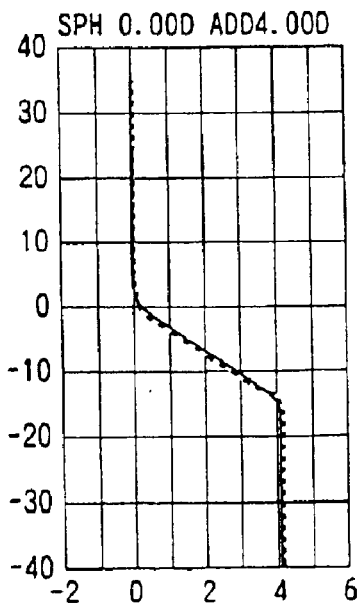
Figure 15F:
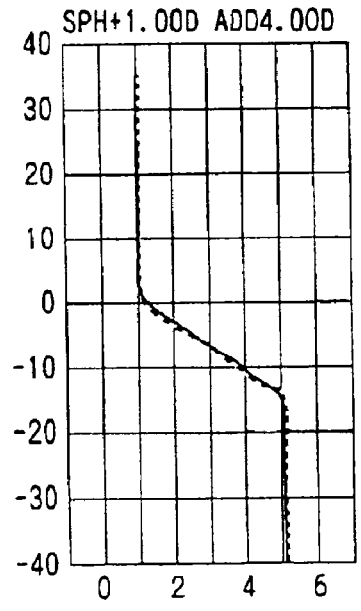
Figure 16A:
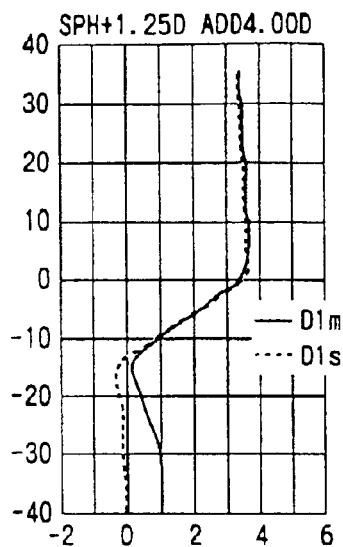
FIGS. 16A–16C are graphs showing surface power of a progressive power spectacle lens in group IV, addition power of 4.00 D.
Figure 16B:
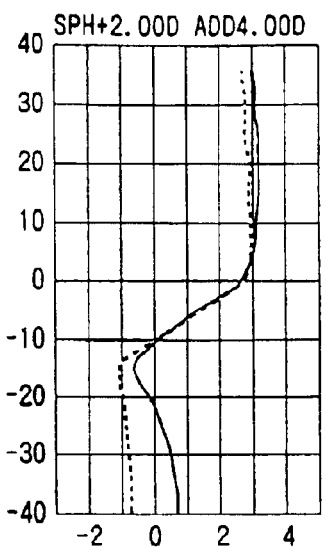
Figure 16C:
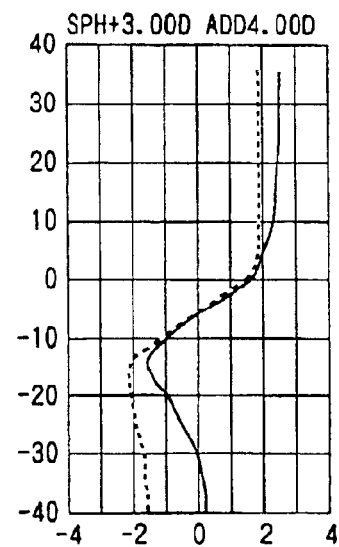
Figure 16D:
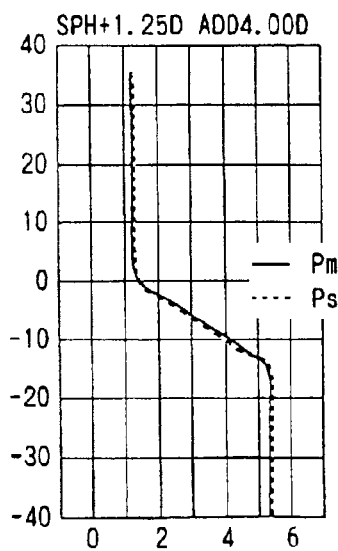
FIGS. 16D–16F are graphs showing powers based on as-worn evaluation.
Figure 16E:
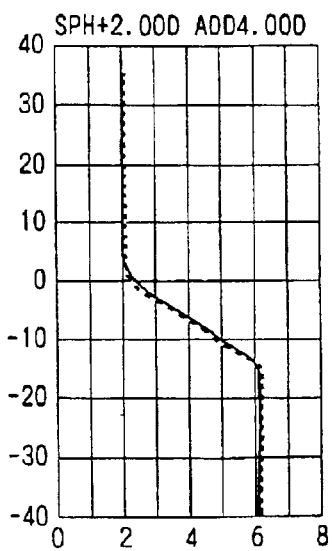
Figure 16F:
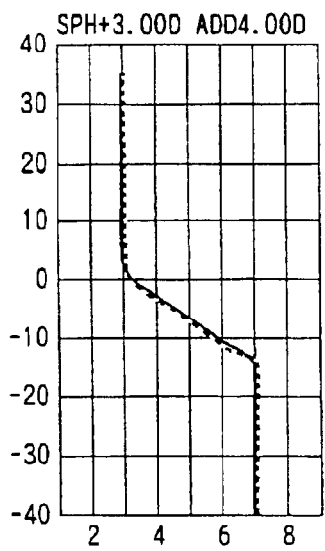
Figure 17A:
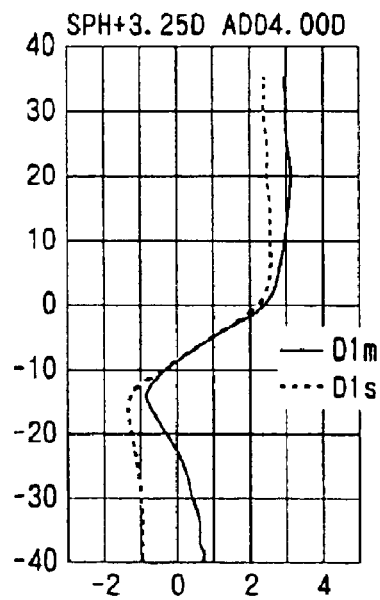
FIGS. 17A–17C are graphs showing surface power of a progressive power spectacle lens in group V, addition power of 4.00 D.
Figure 17B:
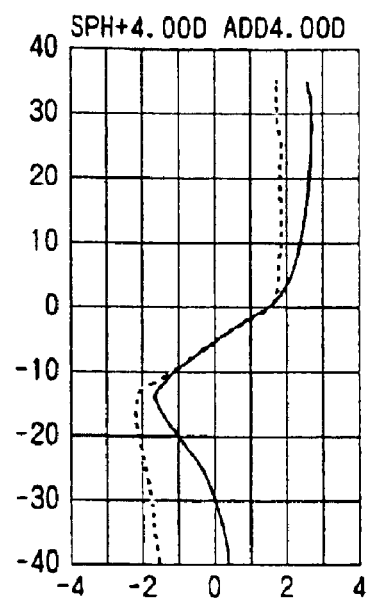
Figure 17C:
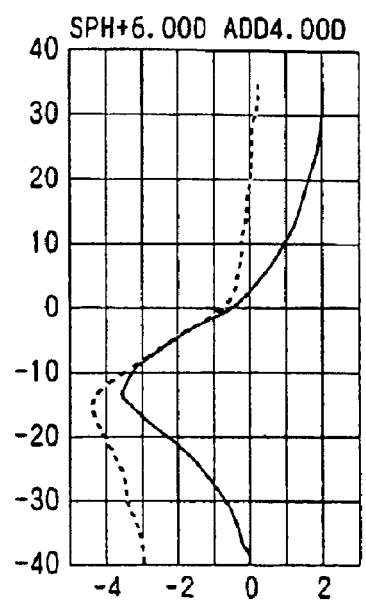
Figure 17D:
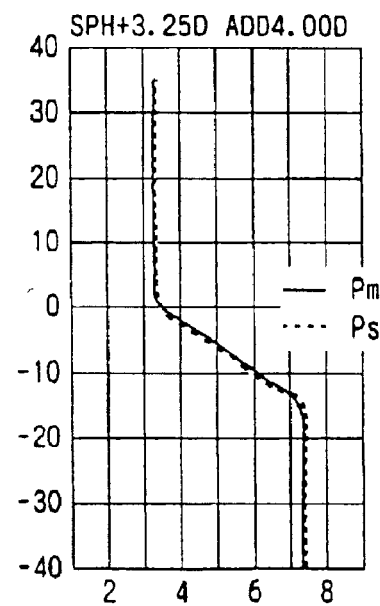
FIGS. 17D–17F are graphs showing powers based on as-worn evaluation.
Figure 17E:
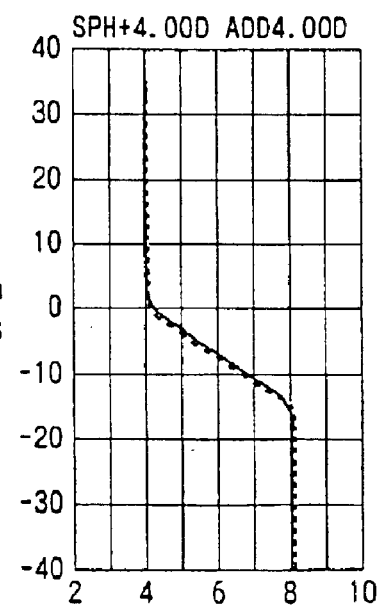
Figure 17F:
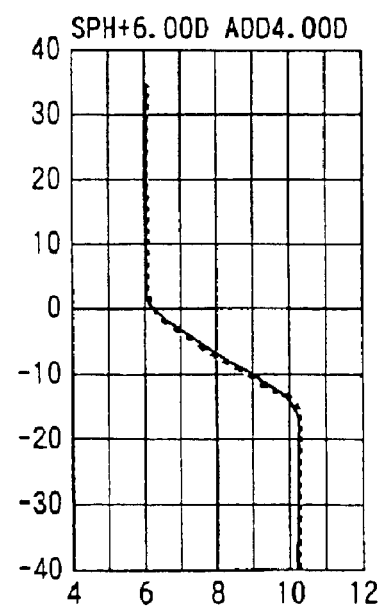

FIGS. 7A, 7B and 7C show surface powers of progressive power surfaces of spectacle lenses for vertex powers SHP of +3.25 D, +4.00 D and +6.00 D included in group V (SHP of +3.25 D through +6.00 D).

FIGS. 8A–12F are similar to FIGS. 3A–7F except that the addition power ADD is 2.00 D. That is, FIGS. 8A–12F show optical performances of progressive power spectacle lenses according to embodiment of the invention for each group, where the cylindrical power CYL is 0.00 D and additional power ADD is 2.00 D. Specifically, in the drawings, FIGS. 8A–8C, 9A–9C, 10A–10C, 11A–11C and 12A–12C show surface powers D1$m$ (solid line) in the direction of main meridian and surface powers D1$s$ (broken lines) in the direction perpendicular to the main meridian, along the main meridian of the back surfaces of the progressive power spectacle lenses for minimum value, intermediate value and maximum value of vertex power SPH in each group. FIGS. 8D–8F, 9D–9F, 10D–10F, 11D–11F and 12D–12F show power Pm (solid line) in the direction of main meridian and power Ps (broke lines) in the direction perpendicular to the main meridian, along the main meridian, of the spectacle lenses corresponding to those shown in FIGS. 8A–8C, 9A–9C, 10A–10C, 11A–11C and 12A–12C, respectively, based on the as-worn evaluation. The transmission performance is evaluated by changing an object distance from infinite to 300 mm for an origin to a near portion of the spectacle lens. FIGS. 8A–8F, 9A–9F, 10A–10F, 11A–11F and 12A–12F correspond to groups I, II, III, IV and V, respectively.

FIGS. 13A–17F are similar to FIGS. 3A–7F except that the addition power ADD is 4.00 D.

As understood from the drawings, according to the invention, since the progressive power surface is designed in accordance with the vertex power of the lens, for all the vertex powers, an excellent performance without astigmatism can be obtained on the main meridian, regardless of the values of the vertex power.

FIGS. 18A–20B show optical characteristics of the progressive power spectacle lens corresponding to FIGS. 10A–10F, which is included in group III and has the addition power of 2.00 D.

Figure 18A:
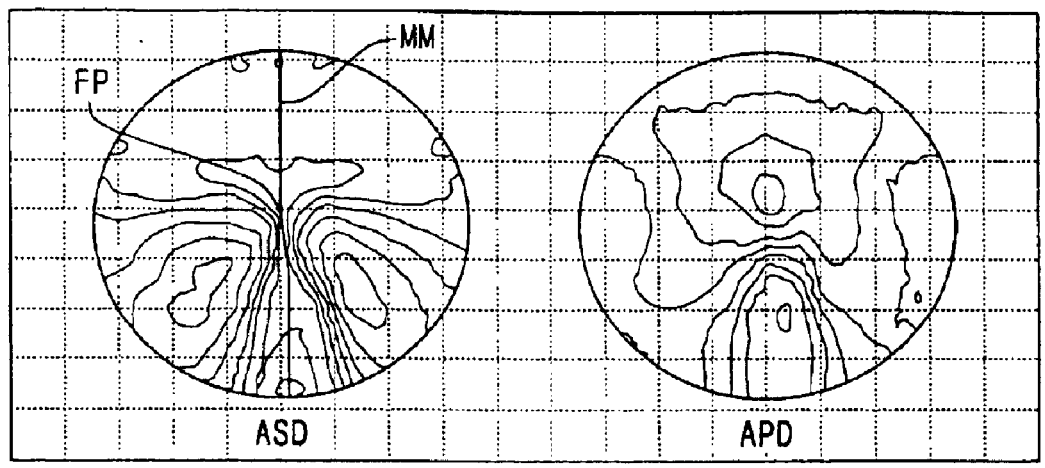
FIG. 18A is a graph showing distribution of surface astigmatism and mean surface power of a progressive power spectacle lens in group III, addition power of −2.00 D.

FIGS. 18A shows a surface performance of the progressive power surface which is a common front surface of lenses falling in group III, and is designed for the vertex power of −2.00 D. The left-hand side circle shows surface astigmatism ASD defined by |D1$m$(Y)−D1$s$(Y)|, and the right-hand side circle shows a mean surface power APD defined by (D1$m$(Y)+D1$s$(Y))/2. It should be noted that a surface power, in the direction of the main meridian, of the progressive power surface is indicated by D1$m$(Y), and a surface power, in the direction perpendicular to the main meridian, of the progressive power surface is represented by D1$s$(Y), Y being a distance from the fitting point. In FIG. 18A, the main meridian MM and the fitting point FP is indicated. In this embodiment, the fitting point FP is slightly above the geometric center of the circle. Since the positional relationship of the main meridian MM and the fitting point FP with respect to the lens is similar in all the embodiments, they are shown only in FIG. 18A. It should be noted that location of the main meridian and the fitting point depends on individual lenses, and FIG. 18A shows only an exemplary location thereof.

Figure 18B:
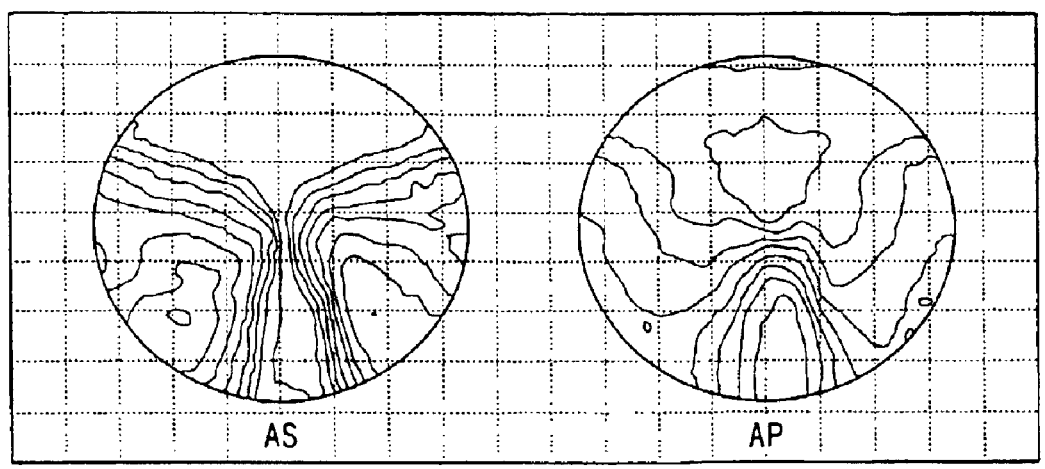
FIG. 18B is a graph showing distribution of the astigmatism and the mean power based on the as-worn evaluation.

FIG. 18B shows the performance of the lens shown in FIG. 18A based on the as-worn evaluation. In FIG. 18B, the left-hand side circle shows a distribution of the astigmatism AS, and the right-hand side circle shows a distribution of the mean power AP.

Figure 19A:
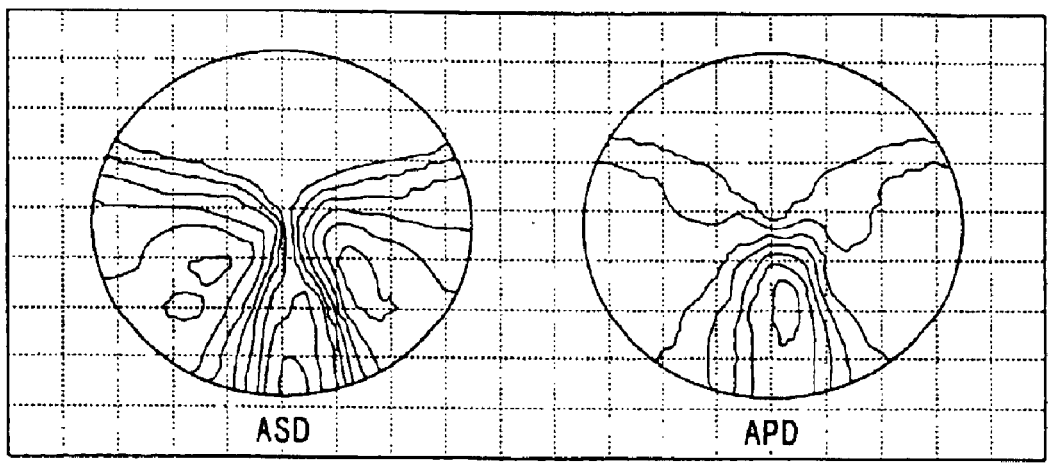
FIG. 19A is a graph showing distribution of surface astigmatism and mean surface power of a progressive power spectacle lens in group III, addition power of 0.00 D.
Figure 19B:
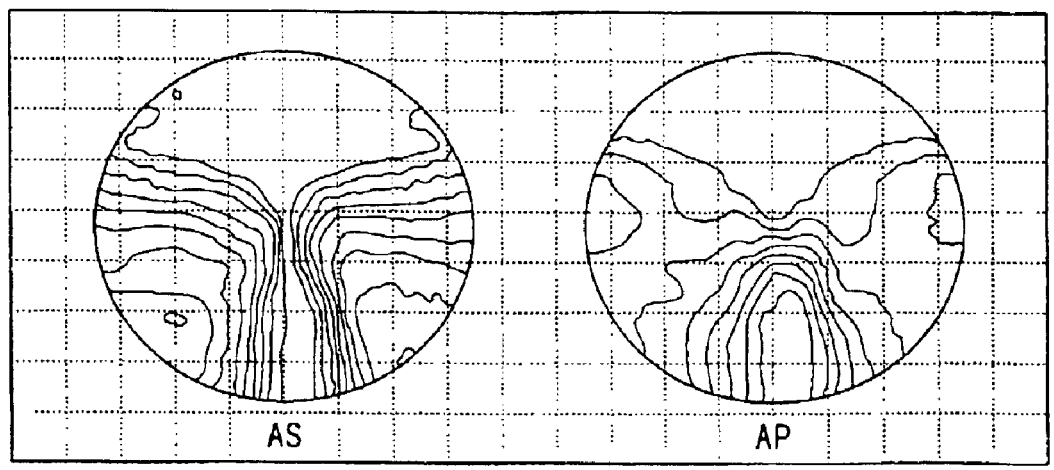
FIG. 19B is a graph showing distribution of the astigmatism and the mean power based on the as-worn evaluation.
Figure 20A:
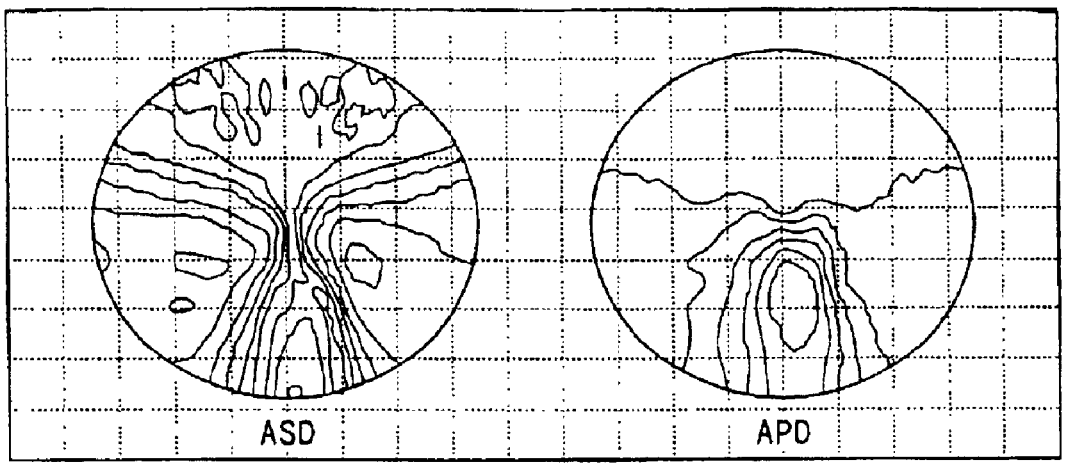
FIG. 20A is a graph showing distribution of surface astigmatism and mean surface power of a progressive power spectacle lens in group III, addition power of +1.00 D.
Figure 20B:
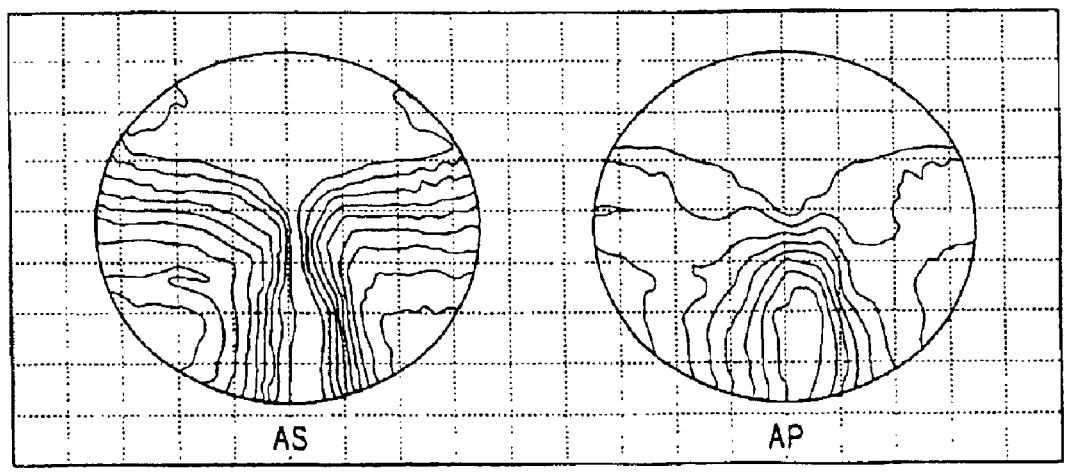
FIG. 20B is a graph showing distribution of the astigmatism and the mean power based on the as-worn evaluation.
Figure 22B:
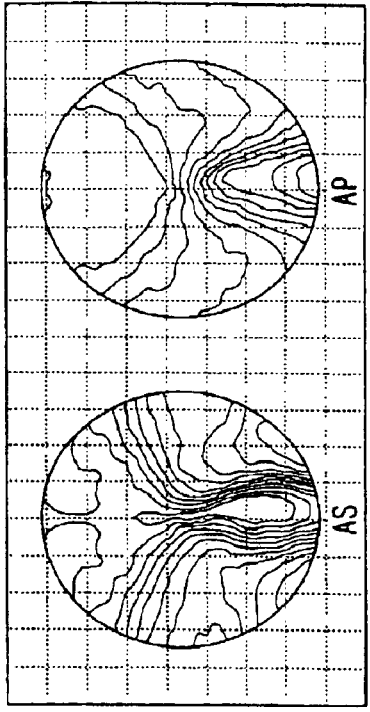
FIGS. 22B–22D are graphs showing distribution of astigmatism and mean power, based on the as-worn evaluation, of progressive power spectacle lenses having different vertex powers.
Figure 22D:
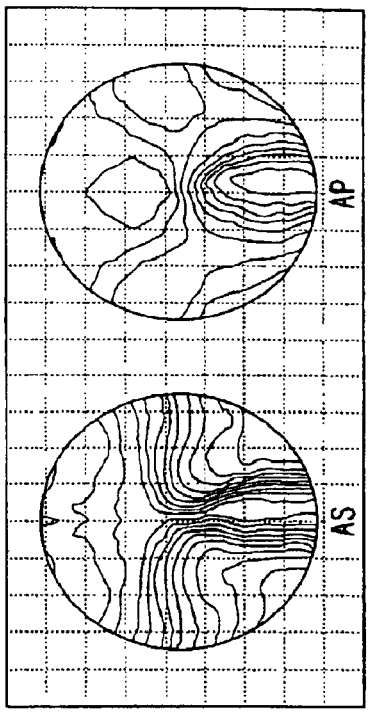
Figure 22A:
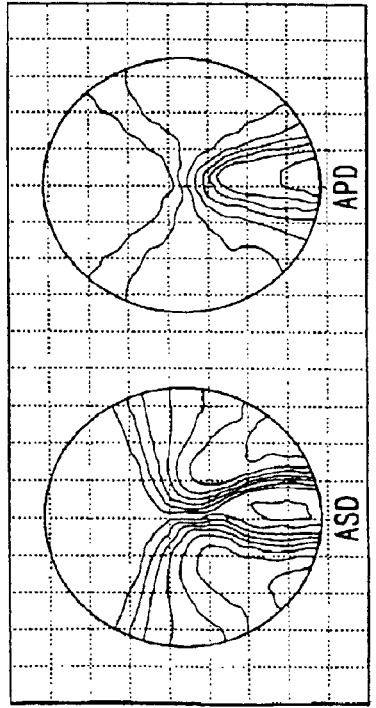
FIG. 22A is a graph showing distribution of surface astigmatism and mean surface power of a common front surface for group III.
Figure 22C:
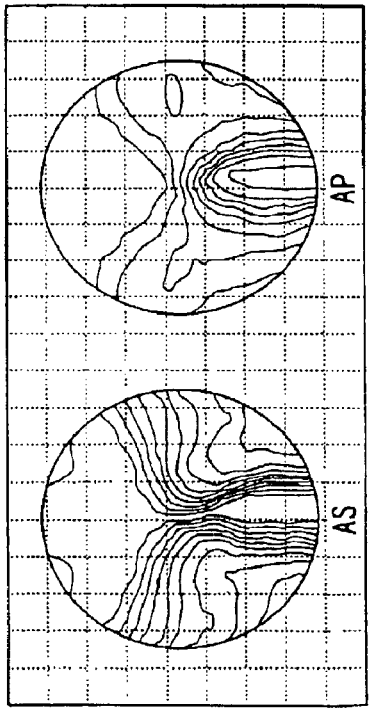

FIGS. 19A and 19B are similar to FIGS. 18A and 18B except that the vertex power is 0.00 D. FIGS. 20A and 20B are similar to FIGS. 18A and 18B except that the vertex power is +1.00 D. As understood by comparing FIGS. 18A–20B with FIGS. 22A–22D, according to the embodiment, even if the front surface is common, by varying the design of the progressive power surface in accordance with the vertex power, the excellent optical performance can be achieved for every vertex power. It should be noted that, as shown in FIGS. 18B, 19B and 20B, a relatively wide clear vision area where the astigmatism is less than a predetermined amount is formed for each vertex power.

Next, conditions which may be satisfied by the progressive power spectacle lens according to the embodiment will be described. In the following description, subscripts i and j represent values for progressive power spectacle lenses falling in the same group, and having different vertex powers.

Firstly, there exists a value Y that satisfies condition (1):

$$D1m_i(Y) \neq D1m_j(Y) \tag{1}$$

According to the above definition, D1$m_i$(Y) and D1$m_j$(Y) represent surface powers, in the direction of the main meridian, of the progressive power surfaces of progressive power spectacle lenses in the same group and having different vertex powers.

Further, there exists a value Y that satisfies condition (2):

$$D1m_i(Y) - D1s_i(Y) \neq D1m_j(Y) - D1s_j(Y) \tag{2}$$

According to the above definition, D1$s_i$(Y) and D1$s_j$(Y) represent surface powers, in the direction perpendicular to the main meridian, of the progressive power surfaces of progressive power spectacle lenses in the same group and having different vertex powers.

As defined by conditions (1) and (2), it is preferable to differentiate the surface powers and/or surface astigmatism.

With such a configuration, an optimum optical performance can be achieved for all the vertex powers in the same group.

The opposite surface, which does not have the progressive power surface, has a common shape for all the lens in the same group regardless of the vertex powers. In the embodiment, the common surface is formed as a spherical surface. However, the common surface may have other shapes, such as an aspherical surface. It is preferable that, when surface powers of the non-progressive power surface (i.e., the opposite surface) of progressive power spectacle lenses in the same group are represented by $D2m_i(Y')$ and $D2m_j(Y')$, where $Y'$ is a distance from an origin (i.e., a fitting point), on the lens surface, along a line where the surface intersects with a plane including an optical axis of the lens, condition (3) is satisfied for all $Y'$:

$$D2m_i(Y')=D2m_j(Y') \qquad (3)$$

It is further preferable that, for all $Y'$, condition (4) is also satisfied.

$$D2m_i(Y')=D2m_j(Y')=D2m_i(0)=D2m_j(0) \qquad (4)$$

Condition (4) indicates that the non-progressive power surface is a spherical surface, which can be processed easily. It should be noted that the optical axis of the lens is defined as a line passing the fitting point and a center of the eyeball in an as-worn condition.

According to the embodiment, the progressive power surface is formed to satisfy the following conditions also. That is, given that the vertex power at the distance reference point is represented by P, that the surface astigmatism defined by $|D1m(Y)-D1s(Y)|$ and mean surface power at a distance Y from the fitting point are represented by ASD(Y) and APD(Y), respectively, and that a change of mean power defined by $|APD(Y)-APD(0)|$ is represented by $\Delta APD(Y)$, there are values Y which satisfies conditions (5)–(7), respectively. As described above, subscripts i and j represent values for progressive power spectacle lenses falling in the same group, and having different vertex powers.

When $P_i<P_j<-3.00$, at a point where $Y \leq -15$, $$ASD_i(Y)>ASD_j(Y) \qquad (5);$$

when $P_i>P_j>+2.00$, at a point where $Y \leq -15$, $$ASD_i(Y)>ASD_j(Y) \qquad (6);$$

when $P_i>P_j>+2.00$, at a point where $Y \geq +5$, $$ASD_i(Y)>ASD_j(Y) \qquad (7); \text{ and}$$

when $P_i>P_j>+2.00$, at a point where $Y>0$, $$\Delta APD_i(Y)>\Delta APD_j(Y) \qquad (8)$$

Numerical examples which satisfy conditions (5)–(8) will be indicated below.

A. EXAMPLE 1

Regarding condition (5), spectacle lenses having the addition power ADD of 1.00 D, and having the vertex powers $P_i$ and $P_j$ ($P_i<P_j<-3.00$) falling in group I will be examined.

The surface astigmatism of the lenses ($P_i=-10.00$ D and $P_j=-6.25$ D) at Y=−20 mm are $ASD_i(-20)=0.252$ D and $ASD_j(-20)=0.177$ D. These values satisfy condition (5).

If the addition power is 2.00 D, $ASD_i(-20)=0.283$ D and $ASD_j(-20)=0.103$ D, which also satisfy condition (5).

If the addition power is 4.00 D, $ASD_i(-20)=0.323$ D and $ASD_j(-20)=0.083$ D, which also satisfy condition (5).

B. EXAMPLE 2

Regarding condition (6), spectacle lenses having the addition power ADD of 1.00 D, and having the vertex powers $P_i$ and $P_j$ ($P_i>P_j>+2.00$) falling in group V will be examined.

The surface astigmatism of the lenses (Pi=+6.00 D and Pj=+3.25 D) at Y=−20 mm are $ASD_i(-20)=0.912$ D and $ASD_j(-20)=0.316$ D. These values satisfy condition (6).

If the addition power is 2.00 D, $ASD_i(-20)=1.190$ D and $ASD_j(-20)=0.511$ D, which also satisfy condition (6).

If the addition power is 4.00 D, $ASD_i(-20)=1.800$ D and $ASD_j(-20)=0.953$ D, which also satisfy condition (6).

C. EXAMPLE 3

Regarding condition (7), spectacle lenses having the addition power ADD of 1.00 D, and having the vertex powers $P_i$ and $P_j$ ($P_i>P_j>+2.00$) falling in group V will be examined.

The surface astigmatism of the lenses (Pi=+6.00 D and Pj=+3.25 D) at Y=10 mm are $ASD_i(10)=1.136$ D and $ASD_j(10)=0.433$ D. These values satisfy condition (7).

If the addition power is 2.00 D, $ASD_i(10)=1.147$ D and $ASD_j(10)=0.421$ D, which also satisfy condition (7).

If the addition power is 4.00 D, $ASD_i(10)=1.170$ D and $ASD_j(10)=0.397$ D, which also satisfy condition (7).

D. EXAMPLE 4

Regarding condition (8), spectacle lenses having the addition power ADD of 1.00 D, and having the vertex powers $P_i$ and $P_j$ ($P_i>P_j>+2.00$) falling in group V will be examined.

For the lenses (Pi=+6.00 D and Pj=+3.25 D), the mean surface powers at a point where Y=15 mm are $APD_i(15)=0.680$ D, $APD_j(15)=2.919$ D, and the mean surface powers APD(Y) at the origin (Y=0) are $APD_i(0)=-0.396$ D and $APD_j(0)=2.601$ D. Therefore, the change of the means surface powers are $\Delta APD_i(15)=1.076$ D and $\Delta APD_j(15)=0.318$ D, which satisfy condition (8).

If the addition power is 2.00 D, $APD_i(15)=0.669$ D and $APD_j(15)=2.900$ D, $APD_i(0)=-0.448$ D and $APD_j(0)=2.559$. Therefore, $\Delta APD_i(15)=1.117$ D and $\Delta APD_j(15)=0.341$ D, which also satisfy condition (8).

If the addition power is 4.00 D, $APD_i(15)=0.649$ D and $APD_j(15)=2.864$ D, $APD_i(0)=-0.552$ D and $APD_j(0)=2.475$. Therefore, $\Delta APD_i(15)=1.201$ D and $\Delta APD_j(15)=0.389$ D, which also satisfy condition (8).

As indicated above, for each addition power, there are values Y which satisfy conditions (5)–(8), respectively.

As described above, according to the embodiment, one surface of a spectacle lens is formed as a common surface for each of the divided groups, and an opposite surface is formed as a progressive power surface to be formed according to the vertex power. With this configuration, for all possible vertex powers, a spectacle lens having an excellent optical performance can be designed and manufactured.

The present disclosure relates to the subject matter contained in Japanese Patent Application No. 2001-275731, filed on Sep. 11, 2001, which is expressly incorporated herein by reference in its entirety.

What is claimed is:

1. A method of manufacturing a progressive power spectacle lens, comprising:
    dividing available vertex powers into a plurality of vertex power groups;
    forming one surface of a spectacle lens as a common surface for the vertex powers within each of the plurality of vertex power groups; and forming an opposite surface of the spectacle lens as a progressive power surface in accordance with a desired vertex power, wherein condition:

$$D1m_i(Y) \neq D1m_j(Y)$$

is satisfied for at least one value Y which represents a distance from a fitting point in a direction of a main meridian of the progressive power surface of the spectacle lens, wherein $D1m(Y)$ represents a surface power in a direction of a main meridian of the progressive power surface of the spectacle lens, subscripts i and j indicating the spectacle lenses having different vertex powers in the same group.

2. The method according to claim 1, wherein condition:

$$D2m_i(Y') = D2m_j(Y')$$

is satisfied for all values of Y' which represents a distance on the one surface, along a line where the one surface intersects with a plane including an optical axis of the spectacle lens, from an optical axis that passes a fitting point and a center of an eyeball, wherein $D2m(Y')$ represents a surface power of the one surface of the spectacle lens, subscripts i and j indicating the spectacle lenses having different vertex powers in the same group.

3. The method according to claim 2, wherein condition:

$$D2m_i(Y') = D2m_j(Y') = D2m_i(0) = D2m_j(0)$$

is satisfied for all values of Y' of each of the one surfaces.

4. The method according to claim 1, wherein condition:

$$ASD_i(Y) > ASD_j(Y)$$

is satisfied for a value Y which represents a distance from a fitting point, wherein $Y \leq -15$ mm, wherein $P_i < P_j < -3.00$, $P_i$ and $P_j$ representing the vertex powers at the distance reference points of spectacle lenses having different vertex powers, respectively, subscripts i and j indicating values for the spectacle lenses having different vertex powers in the same group, wherein ASD(Y) represents the surface astigmatism defined as $|D1m(Y)-D1s(Y)|$ at the distance Y, $D1m(Y)$ representing a surface power in a direction of a main meridian of the progressive power surface of the spectacle lens, $D1s$ representing a surface power in a direction perpendicular to the main meridian of the progressive power surface of the spectacle lens.

5. The method according to claim 1, wherein condition:

$$ASD_i(Y) > ASD_j(Y)$$

is satisfied for a value Y which represents a distance from a fitting point, wherein $Y \leq -15$ mm, wherein $P_i > P_j > +2.00$, $P_i$ and $P_j$ representing the vertex powers at the distance reference points of spectacle lenses having different vertex powers, respectively, subscripts i and j indicating values for the spectacle lenses having different vertex powers in the same group, wherein ASD(Y) represents the surface astigmatism defined as $|D1m(Y)-D1s(Y)|$ at the distance Y, $D1m(Y)$ representing a surface power in a direction of a main meridian of the progressive power surface of the spectacle lens, $D1s$ representing a surface power in a direction perpendicular to the main meridian of the progressive power surface of the spectacle lens.

6. The method according to claim 1, wherein condition:

$$ASD_i(Y) > ASD_j(Y)$$

is satisfied for a value Y which represents a distance from a fitting point, subscripts i and j indicating values for the spectacle lenses having different vertex powers in the same group, wherein $Y \geq 5$ mm, wherein $P_i > P_j > 2.00$, $P_i$ and $P_j$ representing the vertex powers at the distance reference points of spectacle lenses having different vertex powers, respectively, wherein ASD(Y) represents the surface astigmatism defined as $|D1m(Y)-D1s(Y)|$ at a distance Y from the fitting point, $D1m(Y)$ representing a surface power in a direction of a main meridian of the progressive power surface of the spectacle lens, $D1s$ representing a surface power in a direction perpendicular to the main meridian of the progressive power surface of the spectacle lens.

7. The method according to claim 1, wherein condition:

$$66 \, APD_i(Y) > \Delta APD_j(Y)$$

is satisfied for a value Y which represents a distance from a fitting point, subscripts i and j indicating values for the spectacle lenses having different vertex powers in the same group, wherein $Y > 0$ mm, wherein $P_i > P_j > 2.00$, $P_i$ and $P_j$ representing the vertex powers at the distance reference points of spectacle lenses having different vertex powers, respectively, wherein $\Delta APD(Y)$ represents a change of mean surface power APD(Y), the mean surface power APD(Y) being defined by $(D1m(Y)+D1s(Y))/2$, $D1m(Y)$ representing a surface power in a direction of a main meridian of the progressive power surface of the spectacle lens, $D1s$ representing a surface power in a direction perpendicular to the main meridian of the progressive power surface of the spectacle lens, the change of mean surface power being defined such that $\Delta APD(Y)=|APD(Y)-APD(0)|$.

8. The method according to claim 1, wherein the spectacle lens has a front surface on an object side and a back surface on a eye side, and wherein the front surface is formed as the common surfaces for respective vertex power groups.

9. The method according to claim 1, wherein the common surface is a spherical surface.

10. The method according to claim 1, wherein distributions of at least one of astigmatism and mean power of spectacle lenses within a same group and having different vertex powers are substantially similar to each other.

11. A method of manufacturing a progressive power spectacle lens, comprising:

dividing available vertex powers into a plurality of vertex power groups;

forming one surface of a spectacle lens as a common surface for the vertex powers within each of the plurality of vertex power groups; and forming an opposite surface of the spectacle lens as a progressive power surface in accordance with a desired vertex power, wherein condition:

$$D1m_i(Y)-D1s_j(Y) \neq D1m_j(Y)-D1s_j(Y)$$

is satisfied for at least one value Y, Y representing a distance from a fitting point, wherein $D1m(Y)$ represents a surface power in a direction of a main meridian of the progressive power surface of the spectacle lens, subscripts i and j indicating the spectacle lenses having different vertex powers in the same group, and wherein $D1s(Y)$ represents a surface power, in the direction perpendicular to the main meridian.

12. The method according to claim 11, wherein condition:

$$D2m_i(Y')=D2m_j(Y')$$

is satisfied for a value Y' which represents a distance on the one surface, along a line where the one surface intersects with a plane including an optical axis of the spectacle lens, from an optical axis that passes a fitting point and a center of an eyeball, wherein $D2m(Y')$ represents a surface power of the one surface of the spectacle lens, subscripts i and j indicating the spectacle lenses having different vertex powers in the same group.

13. The method according to claim 12, wherein condition:

$$D2m_i(Y')=D2m_j(Y')=D2m_i(0)=D2m_j(0)$$

is satisfied for at least one value Y' of each of the one surfaces.

14. The method according to claim 11, wherein condition:

$$ASD_i(Y)>ASD_j(Y)$$

is satisfied for a value Y which represents a distance from a fitting point, wherein $Y \leq -5$ mm, wherein $P_i < P_j < -3.00$, $P_i$ and $P_j$ representing the vertex powers at the distance reference points of spectacle lenses having different vertex powers, respectively, subscripts i and j indicating values for the spectacle lenses having different vertex powers in the same group, wherein ASD(Y) represents the surface astigmatism defined as $|D1m(Y)-D1s(Y)|$ at the distance Y, $D1m(Y)$ representing a surface power in a direction of a main meridian of the progressive power surface of the spectacle lens, D1s representing a surface power in a direction perpendicular to the main meridian of the progressive power surface of the spectacle lens.

15. The method according to claim 11, wherein condition:

$$ASD_i(Y)>ASD_j(Y)$$

is satisfied for a value Y which represents a distance from a fitting point, wherein $Y \leq -15$ mm, wherein $P_i > P_j >= 2.00$, $P_i$ and $P_j$ representing the vertex powers at the distance reference points of spectacle lenses having different vertex powers, respectively, subscripts i and j indicating values for the spectacle lenses having different vertex powers in the same group, wherein ASD(Y) represents the surface astigmatism defined as $|D1m(Y)-D1s(Y)|$ at the distance Y, $D1m(Y)$ representing a surface power in a direction of a main meridian of the progressive power surface of the spectacle lens, D1s representing a surface power in a direction perpendicular to the main meridian of the progressive power surface of the spectacle lens.

16. The method according to claim 11, wherein condition:

$$ASD_i(Y)>ASD_j(Y)$$

is satisfied for a value Y which represents a distance from a fitting point, subscripts i and j indicating values for the spectacle lenses having different vertex powers in the same group, wherein $Y \geq 5$ mm, wherein $P_i > P_j > +2.00$, $P_i$ and $P_j$ representing the vertex powers at the distance reference points of spectacle lenses having different vertex powers, respectively, wherein ASD(Y) represents the surface astigmatism defined as $|D1m(Y)-D1s(Y)|$ at a distance Y from the fitting point, $D1m(Y)$ representing a surface power in a direction of a main meridian of the progressive power surface of the spectacle lens, D1s representing a surface power in a direction perpendicular to the main meridian of the progressive power surface of the spectacle lens.

17. The method according to claim 11, wherein condition:

$$\Delta APD_i(Y)>\Delta APD_j(Y)$$

is satisfied for a value Y which represents a distance from a fitting point, subscripts i and j indicating values for the spectacle lenses having different vertex powers in the same group, wherein $Y>0$ mm, wherein $P_i > P_j > +2.00$, $P_i$ and $P_j$ representing the vertex powers at the distance reference points of spectacle lenses having different vertex powers, respectively, wherein $\Delta APD(Y)$ represents a change of mean surface power APD(Y), the mean surface power APD(Y) being defined by $(D1m(Y)+D1s(Y))/2$, $D1m(Y)$ representing a surface power in a direction of a main meridian of the progressive power surface of the spectacle lens, D1s representing a surface power in a direction perpendicular to the main meridian of the progressive power surface of the spectacle lens, the change of mean surface power being defined such that $\Delta APD(Y)=|APD(Y)-APD(0)|$.

18. The method according claim 11, wherein the spectacle lens has a front surface on an object side and a back surface on a eye side, and wherein the front surface is formed as the common surfaces for respective vertex power groups.

19. The method according to claim 11, wherein the common surface is a spherical surface.

20. The method according to claim 11, wherein distributions of at least one of astigmatism and mean power of spectacle lenses within a same group and having different vertex powers are substantially similar to each other.

* * * * *